United States Patent
Kamada et al.

(10) Patent No.: US 7,474,292 B2
(45) Date of Patent: Jan. 6, 2009

(54) LIQUID CRYSTAL DISPLAY DEVICE

(75) Inventors: Tsuyoshi Kamada, Kawasaki (JP); Takashi Sasabayashi, Kawasaki (JP); Kazuya Ueda, Kawasaki (JP); Hidefumi Yoshida, Kawasaki (JP)

(73) Assignees: Fujitsu Limited, Kawasaki (JP); Au Optronics Corporation, Hsinchu (TW)

( * ) Notice: Subject to any disclaimer, the term of this patent is extended or adjusted under 35 U.S.C. 154(b) by 699 days.

(21) Appl. No.: 11/043,906

(22) Filed: Jan. 26, 2005

(65) Prior Publication Data

US 2005/0219186 A1  Oct. 6, 2005

(30) Foreign Application Priority Data

Mar. 31, 2004 (JP) ............................. 2004-106138

(51) Int. Cl.
    *G09G 3/36* (2006.01)
(52) U.S. Cl. .......................... 345/90; 345/88; 345/89; 349/129; 349/130; 349/139; 349/141
(58) Field of Classification Search .................. 345/90, 345/88–89; 349/129–130, 139, 141

See application file for complete search history.

(56) References Cited

U.S. PATENT DOCUMENTS

| 4,840,460 A | 6/1989 | Bernot et al. |
| 5,126,865 A | 6/1992 | Sarma |
| 5,576,863 A | 11/1996 | Aoki et al. |
| 6,680,771 B2 * | 1/2004 | Yu et al. ..................... 349/139 |
| 7,233,377 B2 * | 6/2007 | Liao et al. ................... 349/130 |

FOREIGN PATENT DOCUMENTS

CN  1482499  3/2004

* cited by examiner

*Primary Examiner*—Richard Hjerpe
*Assistant Examiner*—Leonid Shapiro
(74) *Attorney, Agent, or Firm*—Greer, Burns & Crain, Ltd.

(57) ABSTRACT

A picture element electrode is divided into sub picture element electrodes by slits extending obliquely. Further, a control electrode is formed over an auxiliary capacitance bus line. Part of the sub picture element electrodes overlaps the control electrode and is capacitively coupled to the control electrode. The control electrode and the source electrode of a TFT are connected through an interconnection. Part of the sub picture element electrodes is electrically connected to the interconnection. Further, part of the sub picture element electrodes is electrically connected to an interconnection extending from the control electrode.

17 Claims, 30 Drawing Sheets

FIG. 24A
FIG. 24B
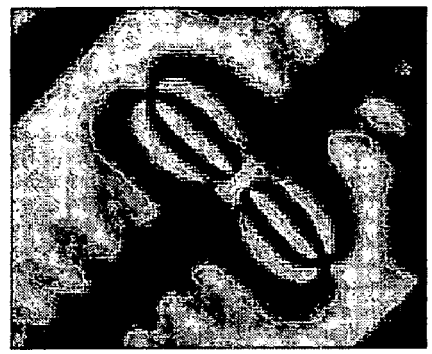
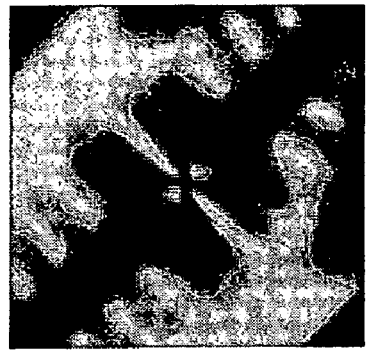
FIG. 25A
FIG. 25B
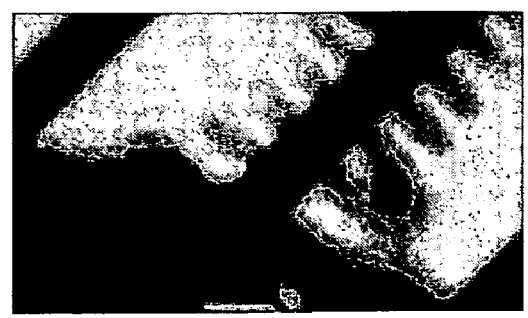

LIQUID CRYSTAL DISPLAY DEVICE

CROSS-REFERENCE TO RELATED APPLICATIONS

This application is based on and claims priority of Japanese Patent Application No.2004-106138 filed in Mar. 31, 2004, the entire contents of which are incorporated herein by reference.

BACKGROUND OF THE INVENTION

1. Field of the Invention

The present invention relates to a multi-domain vertical alignment (MVA) liquid crystal display device having a plurality of regions (domains) in which the orientations of liquid crystal molecules are different from each other. In particular, the present invention relates to a liquid crystal display device in which a picture element electrode is divided into a plurality of sub picture element electrodes.

2. Description of the Prior Art

Liquid crystal display devices have the advantages that they are thin and light compared to cathode-ray tube (CRT) displays and that they can be operative at low voltages and have low power consumption. Accordingly, liquid crystal display devices are used in various kinds of electronic devices including televisions, notebook personal computers (PCs), desktop PCs, personal digital assistants (PDAs), and mobile phones. In particular, active matrix liquid crystal display devices in which a thin film transistor (TFT) as a switching element is provided for each picture element (sub-pixel) show excellent display characteristics, which are comparable to those of CRT displays, because of high operation capabilities thereof, and therefore have come to be widely used even in fields where CRT displays have been used heretofore, such as desktop PCs and televisions.

In general, as shown in FIG. 1, a liquid crystal display device includes: two transparent substrates 10 and 20 which are placed with spacers 31 interposed therebetween and which are bonded together using a sealing member 32; and liquid crystals 30 contained between the substrates 10 and 20. On one substrate 10, a picture element electrode, a TFT, and the like are formed for each picture element. On the other substrate 20, color filters facing the picture element electrodes and a common electrode, which is common to the picture elements, are formed. The color filters are classified into three types of red (R), green (G), and blue (B). A color filter of any one color is placed in each picture element. Three picture elements of red (R), green (G), and blue (B) which are adjacently placed constitute one pixel.

Hereinafter, the substrate on which the picture element electrodes and the TFTs are formed is referred to as a TFT substrate, and the substrate placed to face the TFT substrate is referred to as a counter substrate. Further, the structure formed by filling the liquid crystals into the space between the TFT substrate and the counter substrate is referred to as a liquid crystal panel.

The TFT substrate 10 is formed to be larger than the counter substrate 20 by an amount corresponding to connection terminals. Polarizing plates 41 and 42 are placed on both sides of the liquid crystal panel 40 including the TFT substrate 10 and the counter substrate 20, respectively. Moreover, a backlight (not shown) is placed under the liquid crystal panel 40.

Heretofore, twisted nematic (TN) liquid crystal display devices have been widely used in which horizontal alignment-type liquid crystals (liquid crystals with positive dielectric anisotropy) are contained between two substrates 10 and 20 and in which the liquid crystal molecules are twisted and aligned. However, TN liquid crystal display devices have the disadvantage that viewing angle characteristics are poor and that contrast and color greatly change when the screen is viewed from an oblique direction. Accordingly, vertical alignment (VA) liquid crystal display devices and multi-domain vertical alignment (MVA) liquid crystal display devices, which have favorable viewing angle characteristics, have been developed and put into practical use.

FIGS. 2A and 2B are cross-sectional schematic views showing one example of an MVA liquid crystal display device. A TFT substrate 10 and a counter substrate 20 are placed with spacers (not shown) interposed therebetween, and vertical alignment-type liquid crystals (liquid crystals with negative dielectric anisotropy) 30 are contained between these substrates 10 and 20. On a picture element electrode 12 of the TFT substrate 10, a plurality of bank-like protrusions 13 are formed as domain regulation structures. The surfaces of the picture element electrode 12 and the protrusions 13 are covered with a vertical alignment film 14 made of, for example, polyimide.

A plurality of bank-like protrusions 23 are also formed as domain regulation structures under a common electrode 22 of the counter substrate 20. These protrusions 23 are placed at positions obliquely deviated from the protrusions 13 on the substrate 10. The surfaces of the common electrode 22 and the protrusions 23 are also covered with a vertical alignment film 24 made of, for example, polyimide.

In the MVA liquid crystal display device, in the state where a voltage is not applied between the picture element electrode 12 and the common electrode 22, most of the liquid crystal molecules 30a are aligned perpendicular to the substrate surfaces as shown in FIG. 2A. However, the liquid crystal molecules 30a in the vicinities of the protrusions 13 and 23 are aligned with directions perpendicular to the inclined surfaces of the protrusions 13 and 23.

When a predetermined voltage is applied between the picture element electrode 12 and the common electrode 22, the liquid crystal molecules 30a are aligned with an oblique direction relative to the substrate surfaces under the influence of an electric field. In this case, as shown in FIG. 2B, the tilt directions of the liquid crystal molecules 30a are different on opposite sides of each of the protrusions 13 and 23, and so-called domain division (multi-domain) is achieved.

As shown in this FIG. 2B, in the MVA liquid crystal display device, the tilt directions of the liquid crystal molecules 30a when a voltage is applied are different on opposite sides of each of the protrusions 13 and 23. Accordingly, the leakage of light in oblique directions is suppressed, and excellent viewing angle characteristics can be obtained.

Although the case where domain regulation structures are protrusions has been described in the above-described example, slits provided in electrodes or dimples (grooves) in a substrate surface are used as domain regulation structures in some cases. Further, though an example in which domain regulation structures are provided on both of the TFT substrate 10 and the counter substrate 20 has been described in FIGS. 2A and 2B, domain regulation structures may be formed only on any one of the TFT substrate 10 and the counter substrate 20.

FIG. 3 shows an example in which slits 12a are formed as domain regulation structures in the picture element electrode 12 on the TFT substrate 10. Since electric flux lines occur in oblique directions in the vicinities of the edge portions of the slits 12a, the tilt directions of the liquid crystal molecules 30a are different on opposite sides of each slit 12a. Thus, alignment division is achieved, and viewing angle characteristics are improved.

FIG. 4 is a plan view showing one picture element of an actual MVA liquid crystal display device, and FIG. 5 is a cross-sectional schematic view of a TFT substrate of the same liquid crystal display device.

On the TFT substrate 50, a plurality of gate bus lines 51 extending horizontally and a plurality of data bus lines 55 extending vertically are placed with predetermined pitches, respectively. Each of the rectangular areas defined by the gate bus lines 51 and the data bus lines 55 is a picture element region. Further, auxiliary capacitance bus lines 52 which are placed parallel to the gate bus lines 51 and which cross the centers of the picture element regions are formed on the TFT substrate 50. A first insulating film 61 is formed between the gate bus lines 51 and the data bus lines 55 and between the auxiliary capacitance bus lines 52 and the data bus lines 55. The gate bus lines 51 and the auxiliary capacitance bus lines 52 are electrically isolated from the data bus lines 55 by the first insulating film 61.

For each picture element region, a TFT 54, a picture element electrode 56, and an auxiliary capacitance electrode 53 are formed. The TFT 54 uses part of the gate bus line 51 as a gate electrode. Further, the drain electrode 54d of the TFT 54 is connected to the data bus line 55, and the source electrode 54s thereof is formed at a position where the source electrode 54s faces the drain electrode 54d across the gate bus line 51. Furthermore, the auxiliary capacitance electrode 53 is formed at a position where the auxiliary capacitance electrode 53 faces the auxiliary capacitance bus line 52 with the first insulating film 61 interposed therebetween.

The auxiliary capacitance electrode 53, the TFT 54, and the data bus line 55 are covered with a second insulating film 62, and the picture element electrode 56 is placed on the second insulating film 62. The picture element electrode 56 is made of transparent conductive material such as indium-tin oxide (ITO) or the like and electrically connected to the source electrode 54s of the TFT 54 and the auxiliary capacitance electrode 53 through contact holes 62a and 62b formed in the second insulating film 62. Further, two slits 56a extending diagonally are horizontal-line symmetric, in the picture element electrode 56. The surface of the picture element electrode 56 is covered with a vertical alignment film (not shown) made of, for example, polyimide.

On a counter substrate placed to face the TFT substrate 50, a black matrix (light blocking film), color filters, and a common electrode are formed. As represented by dot-dashed lines in FIG. 4, a plurality of bank-like protrusions 71 bending at positions over the gate bus lines 51 and the auxiliary capacitance bus lines 52 are formed on the common electrode. The slits 56a of the picture element electrodes 56 are placed between the protrusions 71.

In the liquid crystal display device formed as described above, when a predetermined voltage is applied between the picture element electrode 56 and the common electrode, four domains A1, A2, A3, and A4 in which the orientations of liquid crystal molecules 30 are different from each other are formed as shown in FIG. 6. These domains A1, A2, A3, and A4 are separated by the protrusions 71 and the slits 56a as boundaries. In the case where the slits 56a and the protrusions 71 are formed so that the areas of the domains A1, A2, A3, and A4 become approximately equal to each other, the direction dependency of viewing angle characteristics becomes small.

Incidentally, in a known MVA liquid crystal display device, the phenomenon occurs in which the screen looks whitish when viewed from an oblique direction. FIG. 7 is a view showing T-V (transmittance-voltage) characteristics for the case where the screen is viewed from the front and those for the case where the screen is viewed from above in a direction of 60°, with applied voltage (V) on the horizontal axis and transmittance on the vertical axis. As shown in this FIG. 7, in the case where a voltage slightly higher than a threshold voltage is applied to the picture element electrode (portion circled in the drawing), the transmittance when the screen is viewed from the oblique direction is higher than that when the screen is viewed from the front. Further, when the applied voltage becomes high to some extent, the transmittance when the screen is viewed from the oblique direction becomes lower than that when the screen is viewed from the front. Accordingly, differences in brightness between red, green, and blue picture elements become small when the screen is viewed from the oblique direction. As a result, the phenomenon in which the screen looks whitish occurs as described previously. This phenomenon is called discolor. Discolor occurs not only in MVA liquid crystal display devices but also in TN liquid crystal display devices.

In the specification of U.S. Pat. No. 4,840,460, a technology is proposed in which each picture element is divided into a plurality of sub picture elements and in which these sub picture elements are capacitively coupled. In such a liquid crystal display device, since a potential is divided in accordance with the capacitance ratio between the sub picture elements, different voltages can be applied to the sub picture elements, respectively. Accordingly, it appears that a plurality of regions having different thresholds of T-V characteristics exist in each picture element. In the case where a plurality of regions having different thresholds of T-V characteristics exist in each picture element as described above, the phenomenon is suppressed in which the transmittance when the screen is viewed from an oblique direction becomes higher than that when the screen is viewed from the front as shown in FIG. 7. As a result, the phenomenon (discolor) in which the screen looks whitish is also suppressed. A method in which display characteristics are improved by dividing each picture element into a plurality of sub picture elements capacitively coupled is called a halftone grayscale (HT) method by capacitive coupling.

In the specification of Japanese Patent No. 3076938 (Japanese Unexamined Patent Publication No. Hei 5(1993)-66412), a liquid crystal display device is disclosed in which each picture element electrode is divided into a plurality (four in FIG. 8) of sub picture element electrodes 81a to 81d and in which control electrodes 82a to 82d are respectively placed under the sub picture element electrodes 81a to 81d with an insulating film interposed therebetween, as shown in FIG. 8. In this liquid crystal display device, the sizes of the control electrodes 82a to 82d are different from each other, and a display voltage is applied to the control electrodes 82a to 82d through a TFT 80. Further, in order to prevent the leakage of light from between the sub picture element electrodes 81a to 81d, a control electrode 83 is also placed between the sub picture element electrodes 81a to 81d.

In the specification of Japanese Patent No. 3401049 (Japanese Unexamined Patent Publication No. Hei 6(1994)-332009), a liquid crystal display device is disclosed in which each picture element is divided into a plurality of sub picture elements. In this liquid crystal display device, the pre-tilted angles of liquid crystal molecules at the surfaces of the sub picture elements are made to be different from each other by, for example, changing rubbing conditions for each sub picture element.

Each of these known technologies relates to a TN liquid crystal display device.

Incidentally, in the HT method by capacitive coupling, the dividing of each picture element into a plurality of sub picture elements generates gaps between the sub picture elements, and an aperture ratio greatly decreases. In a typical TN liquid crystal display device of the normally white mode, the gaps between sub picture elements become portions in which transmittance is high. Accordingly, a black matrix for blocking light in the gaps between the sub picture elements needs to be formed on a counter substrate. However, in view of the prevention of misalignment in bonding a TFT substrate and the counter substrate together and the prevention of light leakage in oblique directions, the widths of the black matrix need to be set larger than those of the gaps between the sub picture elements by approximately 20 μm (approximately 10 μm on one side). This causes a significant decrease in the aperture ratio.

As described in the specification of Japanese Patent No. 3076938, it is also possible to control the transmittance by forming control electrodes even in the gaps between the sub picture elements. However, in this case, both the control electrodes and the sub picture element electrodes need to be formed of transparent conductive material such as ITO or the like. This requires two steps for depositing transparent conductive material films and two steps for photolithography, and causes an increase in manufacturing cost.

In a liquid crystal display device described in the specification of Japanese Patent No. 3401049, the pre-tilted angles of liquid crystal molecules are made to be different in each sub picture element by, for example, changing rubbing conditions for each sub picture element. However, dust occurring in rubbing can come to be mixed in liquid crystals to deteriorate display quality. Thus, the advantage of MVA liquid crystal display devices that rubbing is unnecessary is lost.

Moreover, in MVA liquid crystal display devices, the pre-tilted angles of liquid crystal molecules need to be stably aligned in a very narrow range of approximately 88 to 89° in order to realize alignment division. For example, if the pre-tilted angles of the liquid crystal molecules become 86° or less, light passes when a voltage is not applied, and contrast decreases; if the pretilt angles become 89.5° or more, the liquid crystal molecules do not easily tilt in predetermined directions when a voltage is applied. However, it is very difficult to control the pretilt angles of the liquid crystal molecules in a range of approximately 88 to 89° with high precision by rubbing. Further, the pretilt angles of the liquid crystal molecules after rubbing has been performed on a vertical alignment film have very poor stability and easily change in water washing and heat treatment thereafter.

SUMMARY OF THE INVENTION

In light of the above, an object of the present invention is to provide a liquid crystal display device in which discolor can be prevented to have favorable display quality, which has a high aperture ratio to enable bright display, and which is easily manufactured.

A liquid crystal display device of a first invention of the present application includes: first and second substrates placed to face each other; vertical alignment-type liquid crystals contained between the first and second substrates; a gate bus line provided on the first substrate and supplied with a scan signal; a data bus line provided on the first substrate and supplied with a display signal; a switching element and a picture element electrode which are formed in each picture element region delimited by the gate bus line and the data bus line; a control electrode provided in the picture element region on the first substrate and connected to the switching element; and a common electrode provided on the second substrate. Here, the picture element electrode is divided into a plurality of sub picture element electrodes; at least part of the plurality of sub picture element electrodes is capacitively coupled to the control electrode; and when a voltage is applied to the control electrode, a voltage according to a ratio between a capacitance formed between the sub picture element electrode capacitively coupled to the control electrode and the control electrode and a capacitance formed between the sub picture element electrode capacitively coupled to the control electrode and the common electrode with the liquid crystals interposed therebetween is applied to the sub picture element electrode capacitively coupled to the control electrode.

In the liquid crystal display device of the present invention, a liquid crystal display device (VA liquid crystal display device and MVA liquid crystal display device) of the VA mode in which vertical alignment-type liquid crystals (liquid crystals with negative dielectric anisotropy) are used and a capacitive coupling structure are combined, whereby high performance which cannot be obtained when either of them is used singly can be obtained.

FIG. 9A is a schematic diagram showing one picture element of a liquid crystal display device in which each picture element electrode is not divided. FIG. 9B is a schematic diagram showing one picture element of a liquid crystal display device in which each picture element electrode is divided into two. FIG. 9C is a schematic diagram showing one picture element of a liquid crystal display device in which each picture element electrode is divided into three. FIG. 9D is a schematic diagram showing one picture element of a liquid crystal display device in which each picture element electrode is divided into four. Further, FIG. 10 is a view showing the relationship between the number of divisions of each picture element electrode, the picture element pitch, and the ratio between aperture ratios in TN liquid crystal display devices and VA liquid crystal display devices, with the picture element pitch on the horizontal axis and the ratio between aperture ratios on the vertical axis. It is noted that the ratio between aperture ratios represents the ratio between the aperture ratio of the liquid crystal display device in which each picture element electrode is not divided and that of a liquid crystal display device in which each picture element electrode is divided.

In TN liquid crystal display devices, since light passes through regions around picture element electrodes, a black matrix (light blocking film) needs to be formed. In general, since the black matrix is formed on a counter substrate, the precision with which a TFT substrate and the counter substrate are bonded together becomes a problem. Accordingly, margins in misalignment for bonding are necessary in design. That is, as represented by dashed lines in FIGS. 9A to 9D, the black matrix needs to be formed to the inside of the picture element electrodes. In general, margins in misalignment for bonding are 5 to 7 μm. In FIG. 10, the ratio between aperture ratios is calculated by assuming that margins in misalignment for bonding are 5 μm.

As can be seen from FIG. 10, the influence of gaps between sub picture element electrodes and the influence of margins in misalignment for bonding increase as the number of divisions increases. However, in the case of n-way division, there are n−1 gaps between the sub picture element electrodes, whereas there are as many as (n+1)×2 margins in misalignment for bonding. Accordingly, the margins in misalignment for bonding greatly influence the aperture ratio. Further, the gaps between the sub picture element electrodes and margins in misalignment for bonding are fixed values reflecting the actual ability or the like of a manufacturing line. Accordingly, in TN liquid crystal display devices, the ratio between aperture ratios sharply decreases when the picture element pitch decreases.

On the other hand, in the cases of liquid crystal display devices of the VA mode, since regions around picture element electrodes do not transmit light, light blocking is unnecessary. Accordingly, even if each picture element electrode is divided, margins in misalignment for bonding are unnecessary, and a decrease in the aperture ratio is small. As can be seen from FIG. 10, in TN liquid crystal display devices, the aperture ratio when each picture element electrode is divided sharply decreases as the picture element pitch decreases. Further, the trend thereof increases as the number of divisions increases. On the other hand, in liquid crystal display devices of the VA mode, even when the picture element pitch becomes small, a decrease in the aperture ratio is small compared to those in TN liquid crystal display devices.

In addition, as described later, a decrease in the aperture ratio can be substantially set to zero by using, as domain regulation structures of an MVA liquid crystal display device, slits for dividing picture element electrodes. That is, the combination of capacitive coupling and an MVA liquid crystal display device is a very good match, and viewing angle characteristics can be improved with a decrease in brightness due to capacitive coupling minimized.

A liquid crystal display device of a second invention of the present application includes: first and second substrates placed to face each other; liquid crystals contained between the first and second substrates; a gate bus line provided on the first substrate and supplied with a scan signal; a data bus line provided on the first substrate and supplied with a display signal; a picture element electrode which is placed in a picture element region delimited by the gate bus line and the data bus line and which is divided into a plurality of sub picture element electrodes by a slit; a switching element connected to the gate bus line and the data bus line; a control electrode connected to the switching element and capacitively coupled to at least one of the plurality of sub picture element electrodes; and a common electrode provided on the second substrate. Here, at least part of the slit dividing the picture element electrode constitutes a domain regulation structure for regulating orientations of liquid crystal molecules when a voltage is applied.

That is, in the present invention, the orientations of liquid crystal molecules are regulated using the slit for isolating the sub picture element electrodes. Accordingly, when compared to the case where a slit for isolating sub picture element electrodes and a slit for regulating the orientations of liquid crystal molecules are separately provided, the number of portions where orientation is disturbed is small, and bright display is made possible.

Moreover, in the present invention, for example, part of the plurality of sub picture element electrodes are capacitively coupled to the control electrode, and the rest of the sub picture element electrodes are connected to the switching element, whereby when a display voltage is supplied, a voltage applied to the part of the sub picture element electrodes and a voltage applied to the rest of the sub picture element electrodes are different and it appears that a plurality of regions having different thresholds of T-V characteristics exist in each picture element. This suppresses the phenomenon (discolor) in which the screen looks whitish when viewed from an oblique direction, and improves display quality.

Instead of connecting the rest of the sub picture element electrodes to the switching element, the rest of the sub picture element electrodes may be capacitively coupled to the control electrode. In this case, voltages at the sub picture element electrodes when a display voltage is supplied can be controlled by adjusting the sizes of the sub picture element electrodes and the amount of overlap between each sub picture element electrode and the control electrode.

In order to more reliably control the orientations of the liquid crystal molecules, it is preferable that a domain regulation structure (second domain regulation structure) is also formed on the second substrate. In this case, a decrease in transmittance can be suppressed by forming an interconnection for connecting the switching element and the control electrode, along the domain regulation structure on the second substrate.

Moreover, if the control electrode is formed on an auxiliary capacitance bus line with an insulating film interposed therebetween, a display voltage supplied through the switching element can be more reliably maintained using the capacitance between the control electrode and the auxiliary capacitance bus line, and capacitances can be formed in the same region two-dimensionally. Accordingly, there is no loss of the aperture ratio. Furthermore, in the case where there are a plurality of sub picture element electrodes capacitively coupled to the control electrode, if a portion capacitively coupled to part of the sub picture element electrodes and a portion capacitively coupled to the rest of the sub picture element electrodes are connected using an interconnection having a narrower width than the auxiliary capacitance bus line, a decrease in transmittance in the intersection of the control electrode and the slit can be suppressed.

Moreover, by forming a conductive pattern connected to the auxiliary capacitance bus line under an interconnection for connecting the switching element and the control electrode, a decrease in transmittance in the intersection of the interconnection and the slit can be suppressed. In addition, the leakage of light in the slit portion can be more reliably prevented by forming a conductive pattern connected to the auxiliary capacitance bus line under the slit.

BRIEF DESCRIPTION OF THE DRAWINGS

FIG. 24A is a light transmission view showing the transmission state of light in a portion of the liquid crystal display device of the fifth embodiment, and FIG. 24B is a light transmission view showing the transmission state of light in the portion of the sixth embodiment which corresponds to FIG. 24A.

FIG. 25A is a light transmission view showing the transmission state of light in other portion of the liquid crystal display device of the fifth embodiment, and FIG. 25B is a light transmission view showing the transmission state of light in the portion of the sixth embodiment which corresponds to FIG. 25A.

DESCRIPTION OF THE PREFERRED EMBODIMENTS

Hereinafter, embodiments of the present invention will be described based on drawings.

First Embodiment

Figure 11:
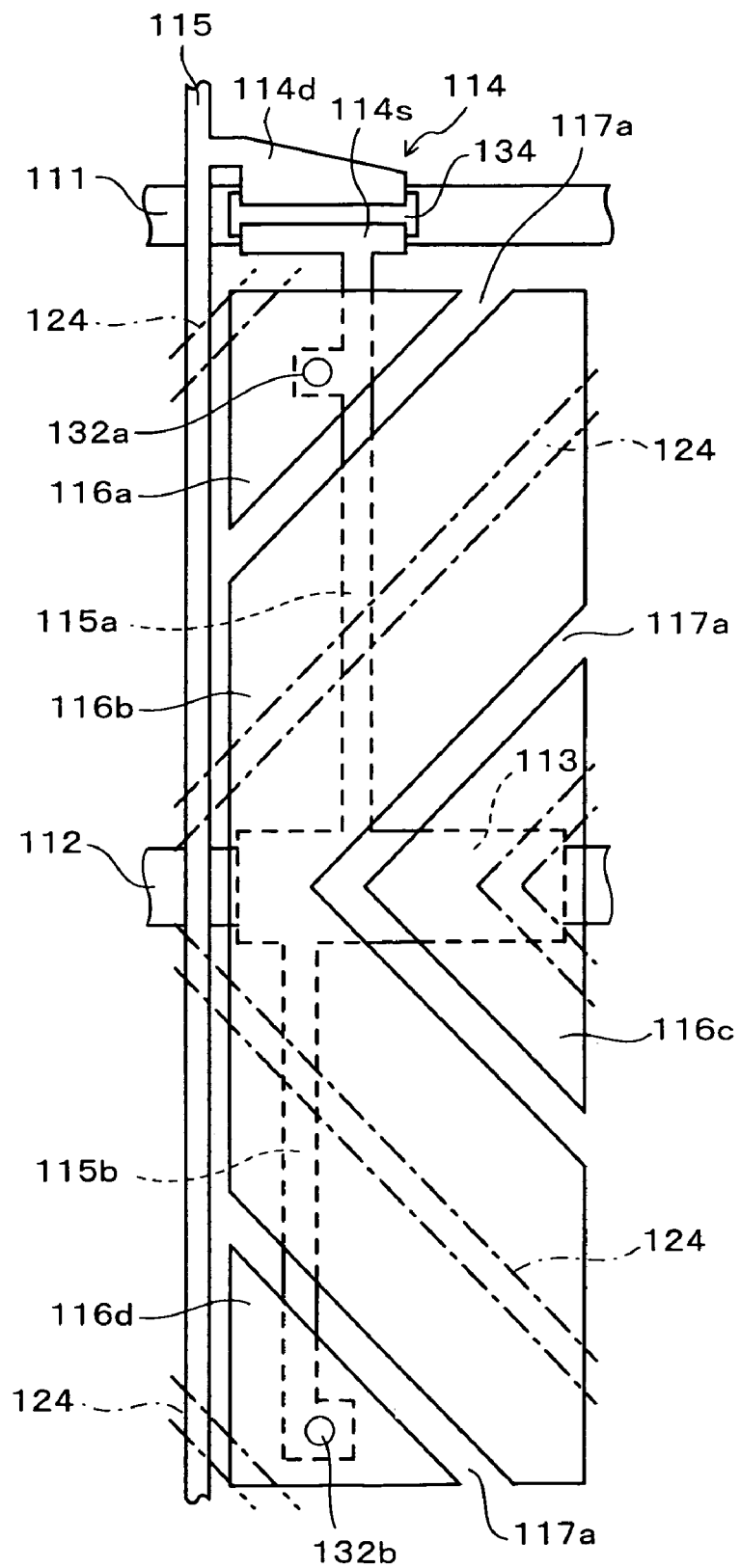
FIG. 11 is a plan view showing a liquid crystal display device of a first embodiment of the present invention.
Figure 12:
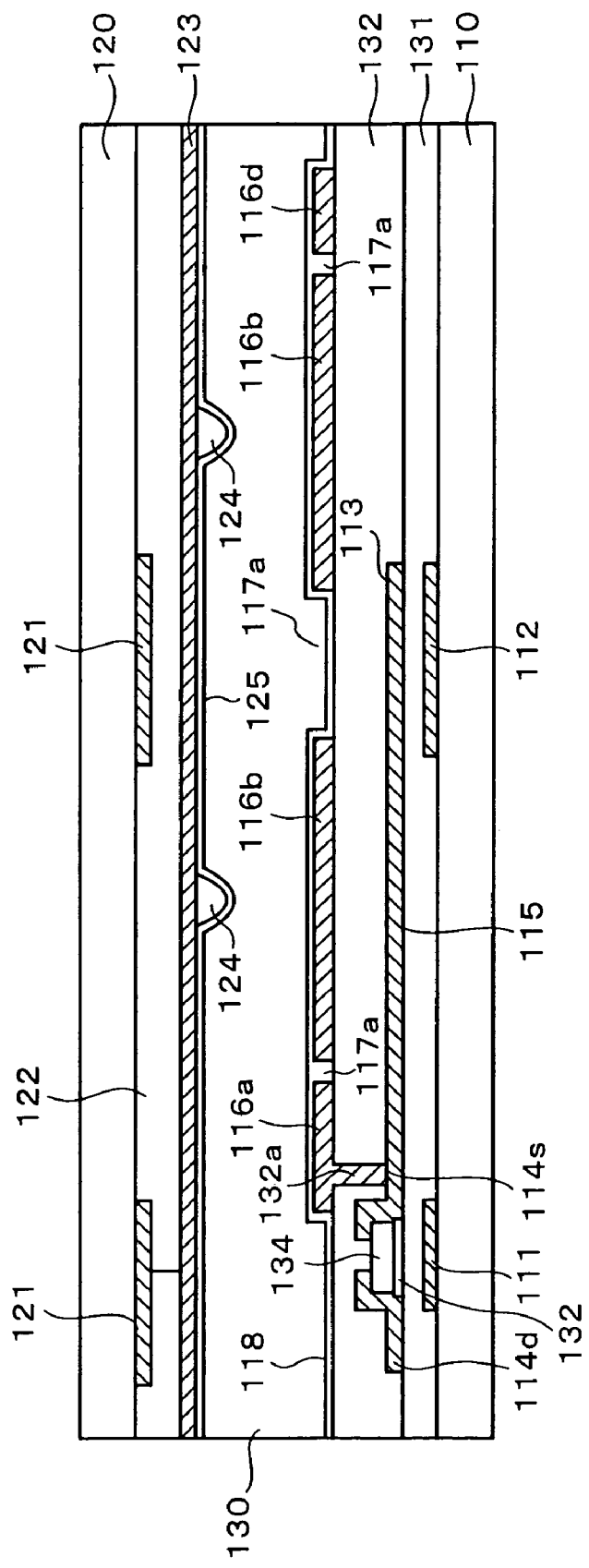
FIG. 12 is a cross-sectional schematic view of the same.

FIG. 11 is a plan view showing a liquid crystal display device of a first embodiment of the present invention, and FIG. 12 is a cross-sectional schematic view thereof.

As shown in FIG. 12, the liquid crystal display device of the present embodiment includes two substrates 110 and 120 made of transparent thin plates, such as glass plates or the like, and vertical alignment-type liquid crystals (liquid crystals with negative dielectric anisotropy) contained between these substrates 110 and 120. As shown in FIG. 11, a plurality of gate bus lines 111 extending horizontally and a plurality of data bus lines 115 extending vertically are formed on the substrate 110. The pitch of the gate bus lines 111 is, for example, approximately 300 μm, and that of the data bus lines 115 is, for example, approximately 100 μm. Each of the rectangular regions defined by the gate bus lines 111 and the data bus lines 115 is a picture element region.

On the substrate 110, auxiliary capacitance bus lines 112, which are placed parallel to the gate bus lines 111 and cross the centers of the picture element regions, are formed. A first insulating film 131 is formed between the gate bus lines 111 and the data bus lines 115 and between the auxiliary capacitance bus lines 112 and the data bus lines 115. The gate bus lines 111 and the auxiliary capacitance bus lines 112 are electrically isolated from the data bus lines 115 by the first insulating film 131.

For each picture element region, a TFT 114, a control electrode 113, and a picture element electrode are formed on the substrate 110. In the present embodiment, as shown in FIG. 11, the picture element electrode is divided into four sub picture element electrodes 116a to 116d by slits 117a extending diagonally, being symmetric about a horizontal line.

The TFT 114 uses part of the gate bus line 111 as a gate electrode. Further, the drain electrode 114d of the TFT 114 is connected to the data bus line 115, and the source electrode 114s thereof is placed at a position where the source electrode 114s faces the drain electrode 114d across the gate bus line 111.

The control electrode 113 is placed at a position where the control electrode 113 faces the auxiliary capacitance bus line 112 with the first insulating film 131 interposed therebetween. The control electrode 113 is connected to the source electrode 114s of the TFT 114 through an interconnection 115a.

The sub picture element electrodes 116a to 116d are made of transparent conductive material, such as ITO or the like. The widths of the slits 117a isolating the sub picture element electrodes 116a to 116d are, for example, 10 μm.

The sub picture element electrode 116a is electrically connected to the interconnection 115a through a contact hole 132a, and the sub picture element electrode 116d is electrically connected to an interconnection 115b extending from the control electrode 113, through a contact hole 132b. Each of the sub picture element electrodes 116b and 116c is capacitively coupled to the control electrode 113 through a second insulating film 132. The sub picture element electrodes 116a to 116d are covered with a vertical alignment film 118 made of, for example, polyimide.

On the other hand, on the surface (lower surface in FIG. 12) of the counter substrate 120, a black matrix (light blocking film) 121 and color filters 122 are formed. The black matrix 121 is made of metal, for example, such as Cr (chromium) or the like, and placed at a position where the black matrix 121 faces the gate bus lines 111, the auxiliary capacitance bus lines 112, the data bus lines 115, and the TFTs 114 on the TFT substrate 110.

The color filters 122 are classified into three types of red, green, and blue. A color filter of any one color among red, green, and blue is placed in each picture element.

Under the color filters 122, a common electrode 123 made of transparent conductive material, such as ITO or the like, is formed. Under the common electrode 123, bank-like protrusions 124 for domain regulation are formed. As shown in FIG. 11, the protrusions 124 bend at positions over the gate bus lines 111 and the auxiliary capacitance bus lines 112, and are placed at positions horizontally deviated from the slits 117a of the TFT substrate 110. The surfaces of the common electrode 123 and the protrusions 124 are covered with a vertical alignment film 125 made of, for example, polyimide.

Hereinafter, the operation of the liquid crystal display device of the present embodiment constituted as described above will be described.

When a predetermined display voltage is supplied to the data bus line 115 and a scan signal is supplied to the gate bus line 111, the TFT 114 is turned on, and the display voltage is written into the sub picture element electrodes 116a and 116d and the control electrode 113, which are connected to the source electrode 114s. Further, since the sub picture element electrodes 116b and 116c are capacitively coupled to the control electrode 113, voltages are also applied to the sub picture element electrodes 116b and 116c.

However, in the present embodiment, as shown in FIG. 11, the area of the sub picture element electrode 116c is smaller than that of the sub picture element electrode 116b, and the amount of overlap between the sub picture element electrode 116c and the control electrode 113 is larger. Accordingly, the voltage at the sub picture element electrode 116c is higher than that at the sub picture element electrode 116b. If the voltage at the sub picture element electrode 116a is denoted by A, that at the sub picture element electrode 116b is denoted by B, that at the sub picture element electrode 116c is denoted by C, and that at the sub picture element electrode 116d is denoted by D, A=D>C>B is obtained.

Figure 1:
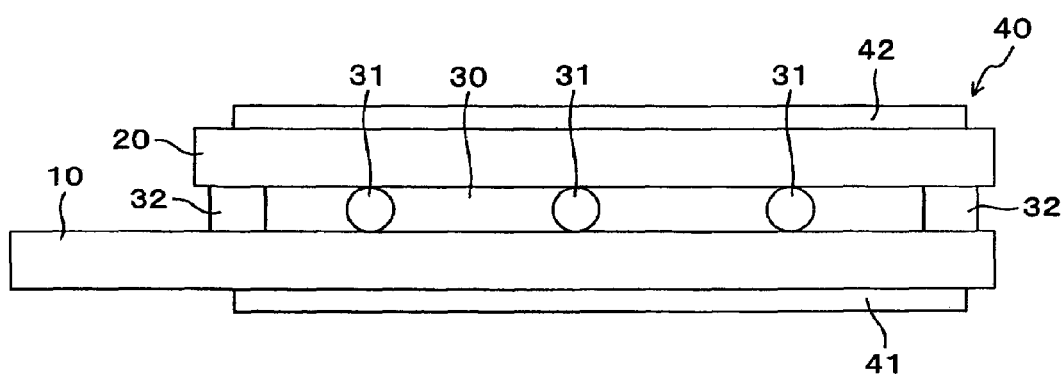
FIG. 1 is a cross-sectional schematic view showing the structure of a known liquid crystal display device.
Figure 2A:
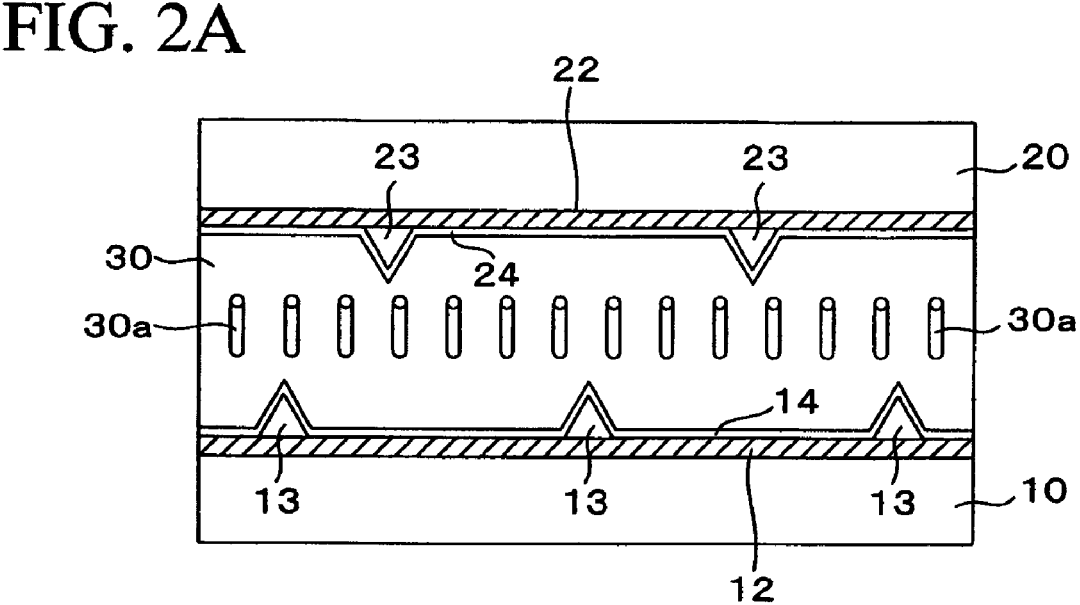
FIGS. 2A and 2B are cross-sectional schematic views showing one example of a known MVA liquid crystal display device.
Figure 2B:
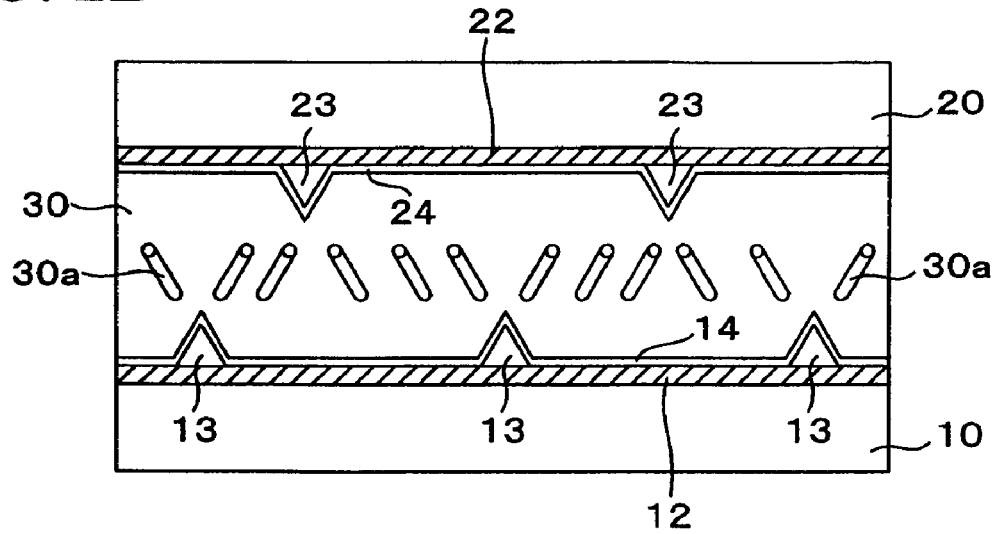
Figure 3:
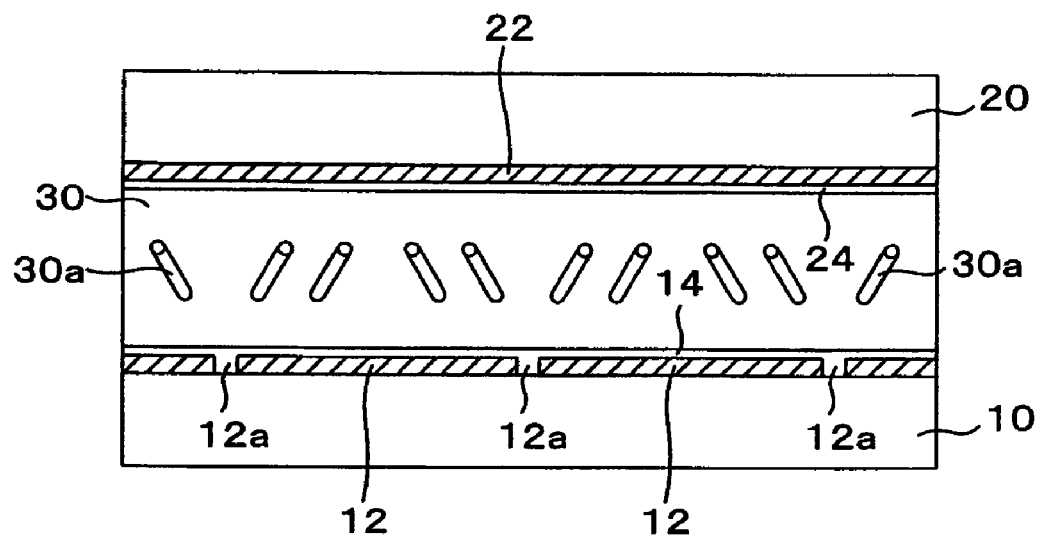
FIG. 3 is a cross-sectional schematic view showing a known MVA liquid crystal display device in which slits are formed as domain regulation structures in picture element electrodes on a TFT substrate.
Figure 4:
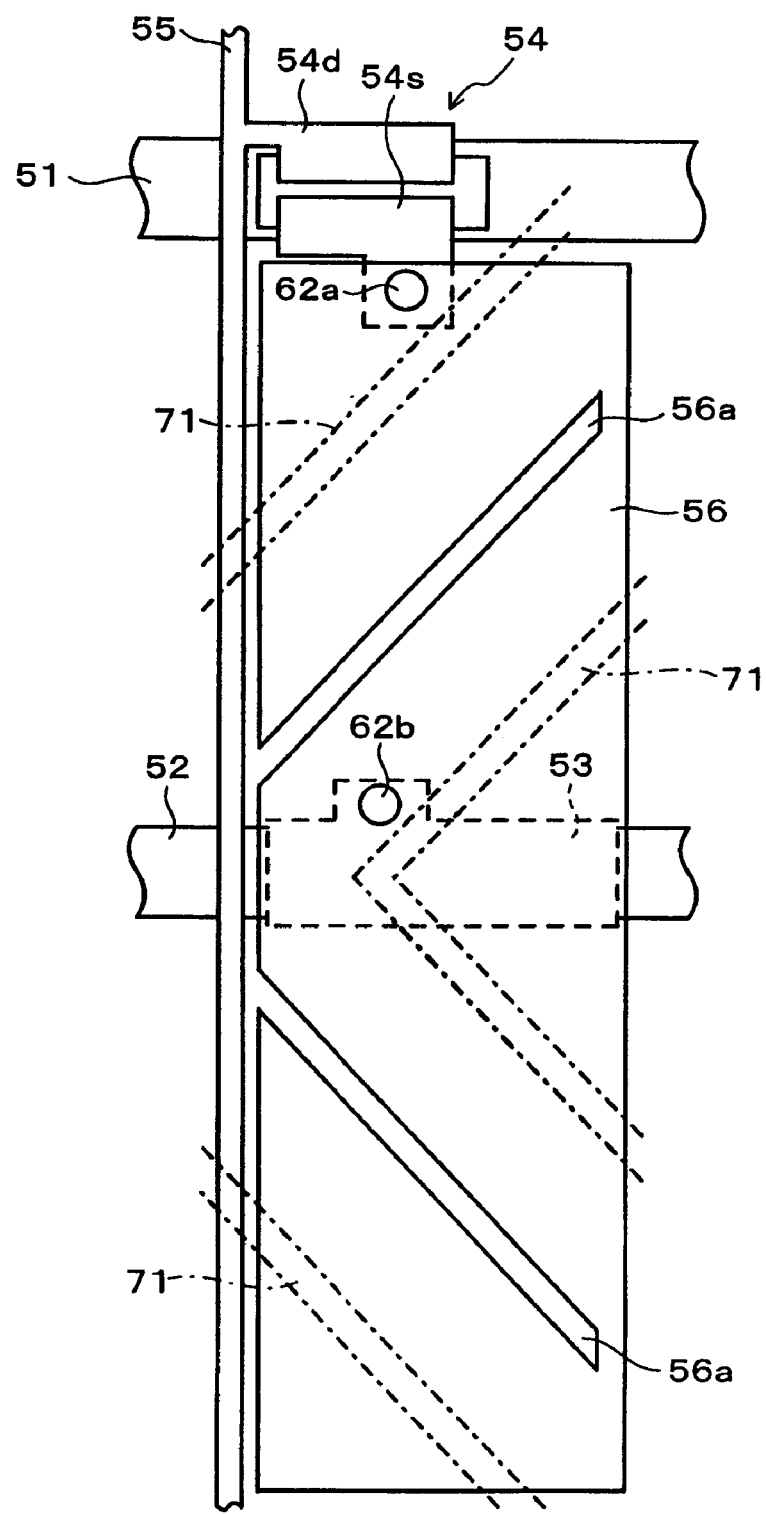
FIG. 4 is a plan view showing one picture element of an actual MVA liquid crystal display device.
Figure 5:
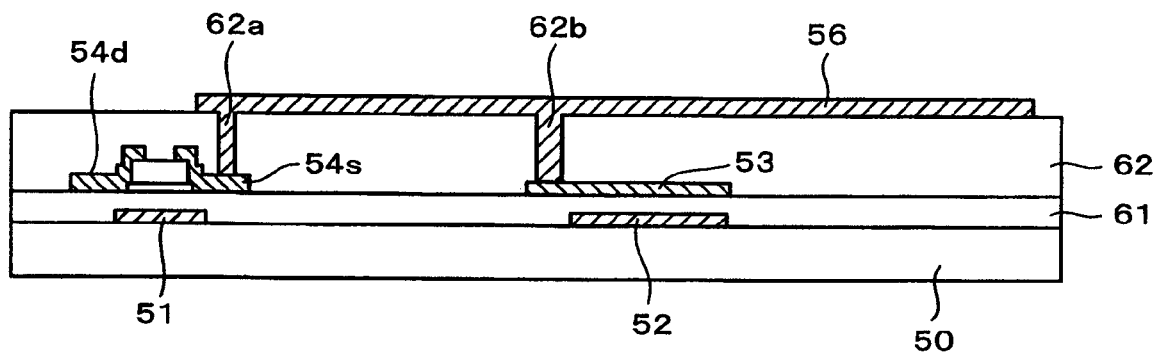
FIG. 5 is a cross-sectional schematic view of a TFT substrate of the same liquid crystal display device.
Figure 6:
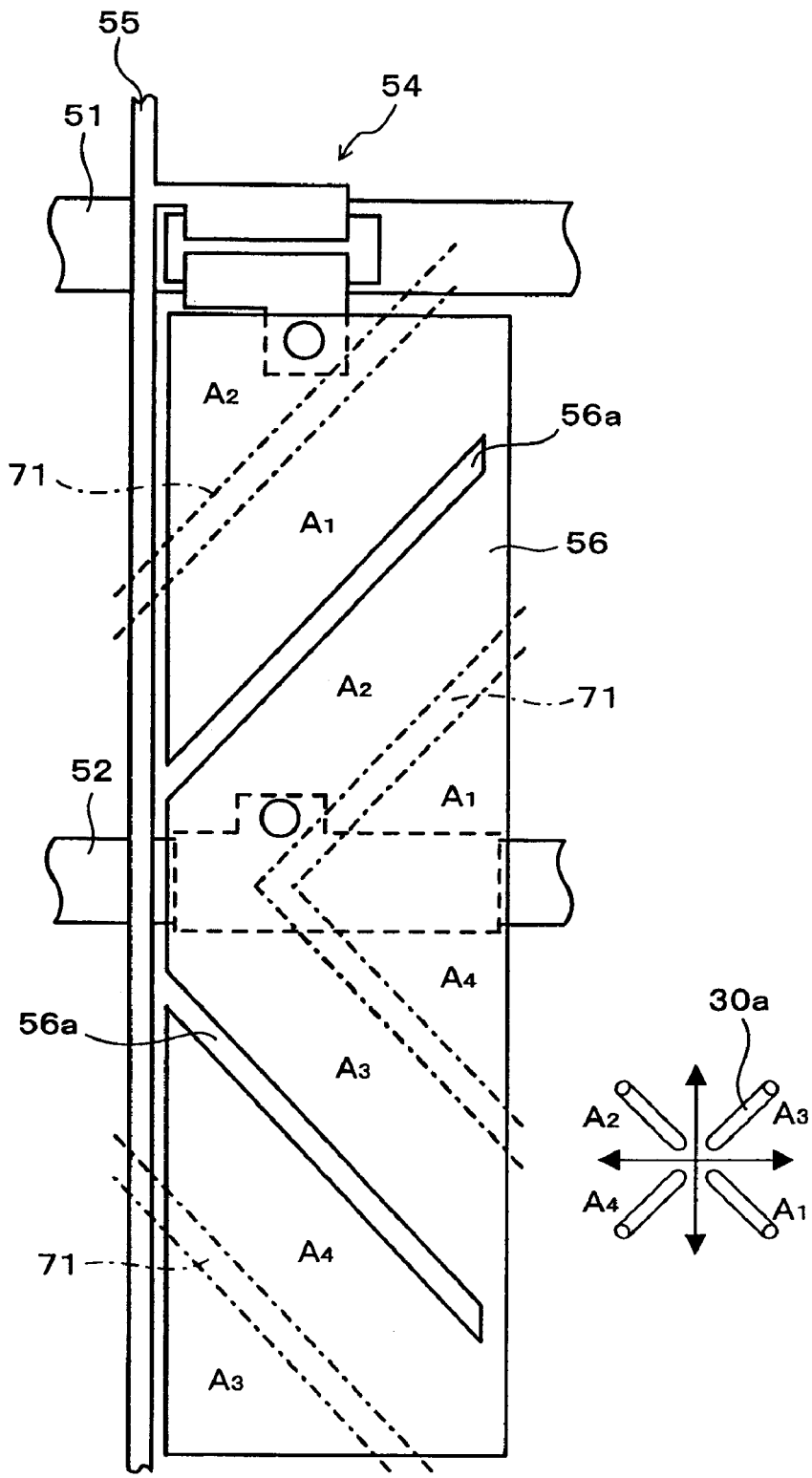
FIG. 6 is a schematic diagram showing four domains in the known MVA liquid crystal display device.
Figure 7:
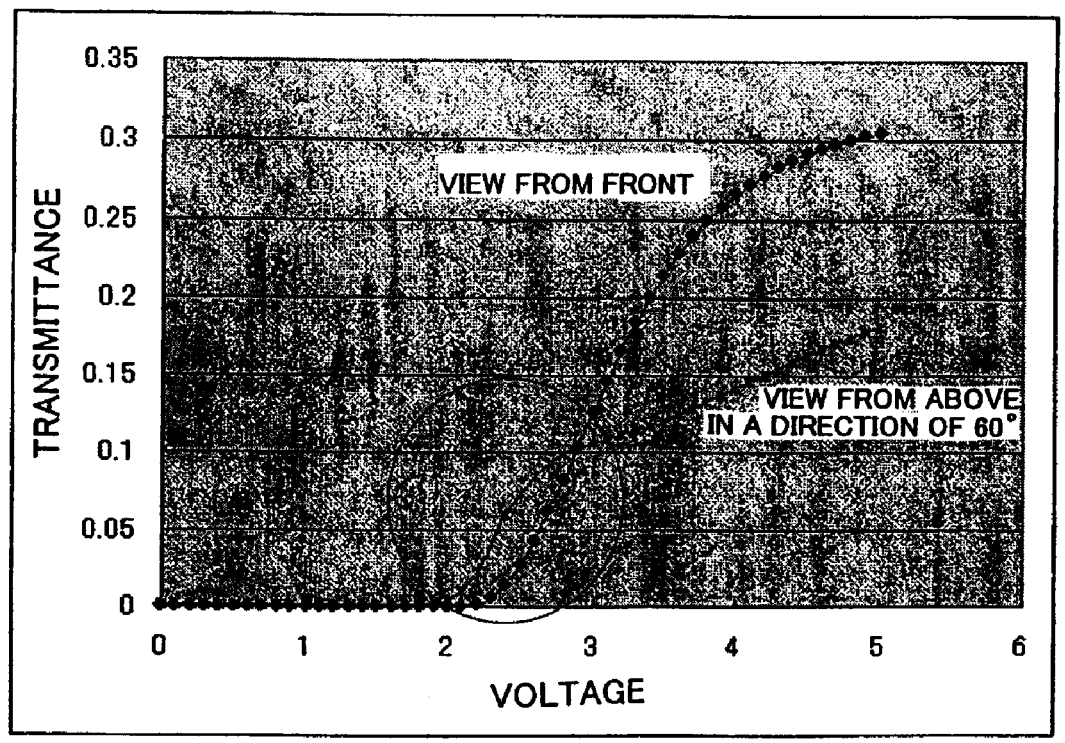
FIG. 7 is a view showing T-V characteristics when a screen is viewed from the front and those when the screen is viewed from above in a direction of 60°.
Figure 8:
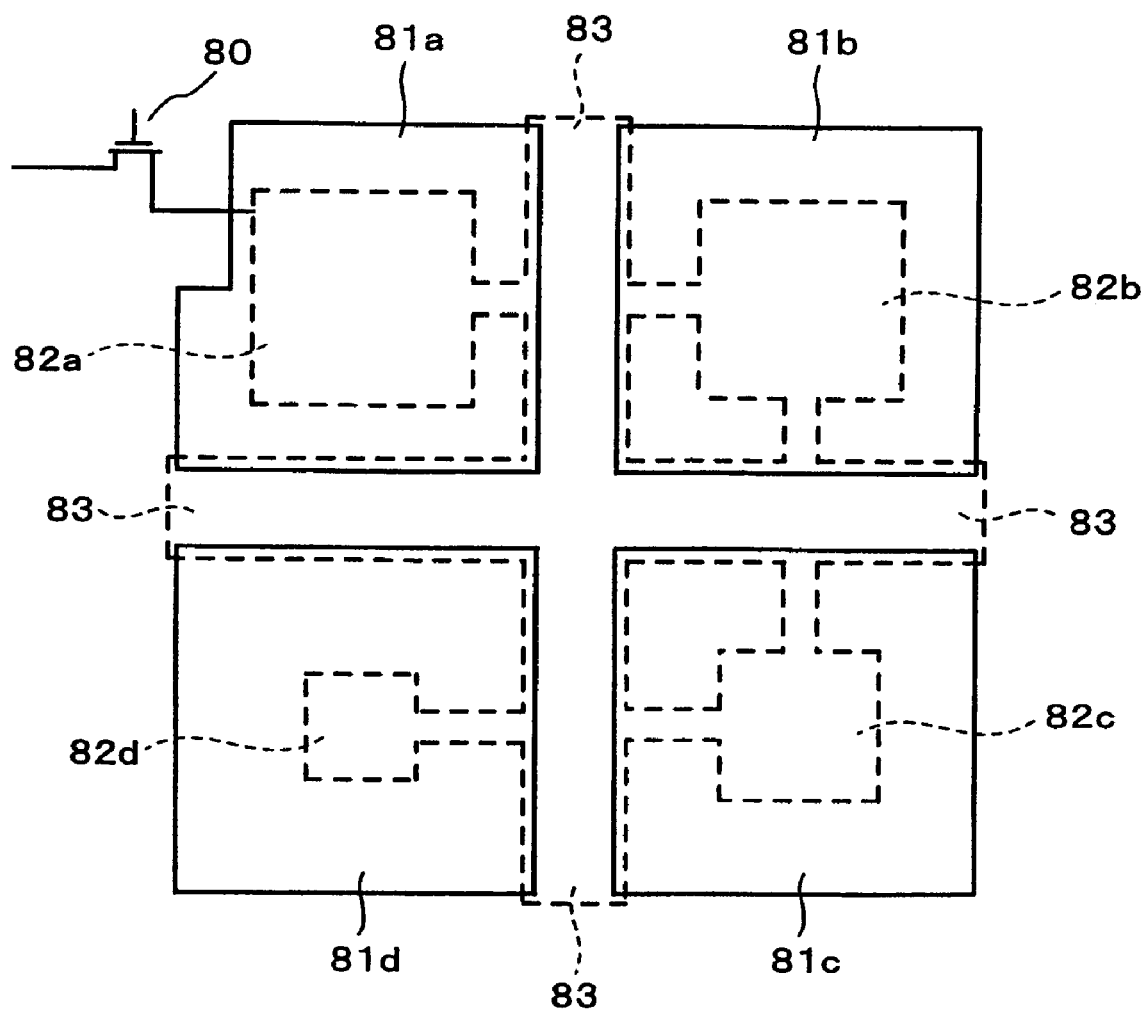
FIG. 8 is a plan view showing one picture element of a known liquid crystal display device in which a halftone grayscale (HT) method by capacitive coupling is used.
Figure 9A:
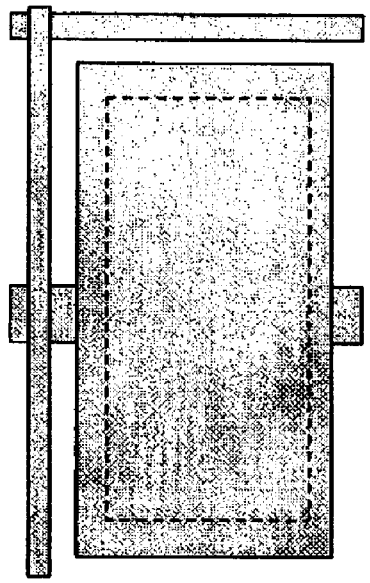
FIG. 9A is a schematic diagram showing one picture element of a liquid crystal display device in which each picture element electrode is not divided.
Figure 9B:
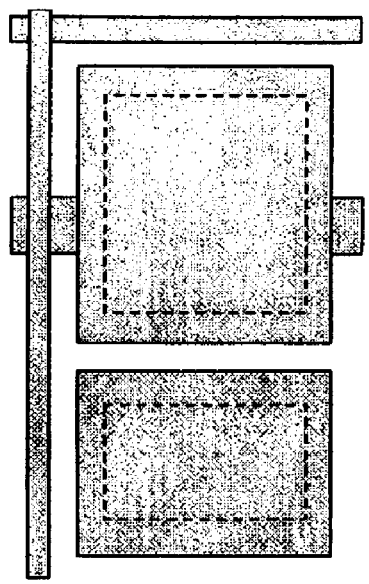
FIG. 9B is a schematic diagram showing one picture element of a liquid crystal display device in which each picture element electrode is divided into two.
Figure 9C:
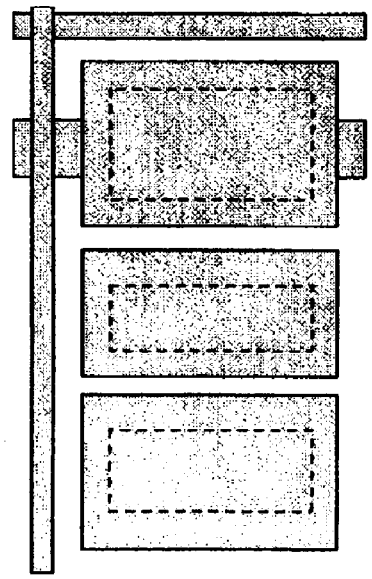
FIG. 9C is a schematic diagram showing one picture element of a liquid crystal display device in which each picture element electrode is divided into three.
Figure 9D:
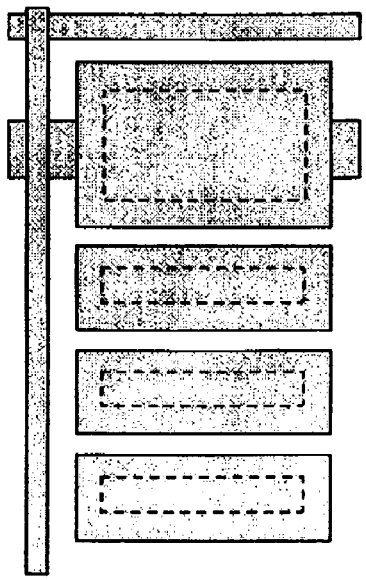
FIG. 9D is a schematic diagram showing one picture element of a liquid crystal display device in which each picture element electrode is divided into four.
Figure 10:
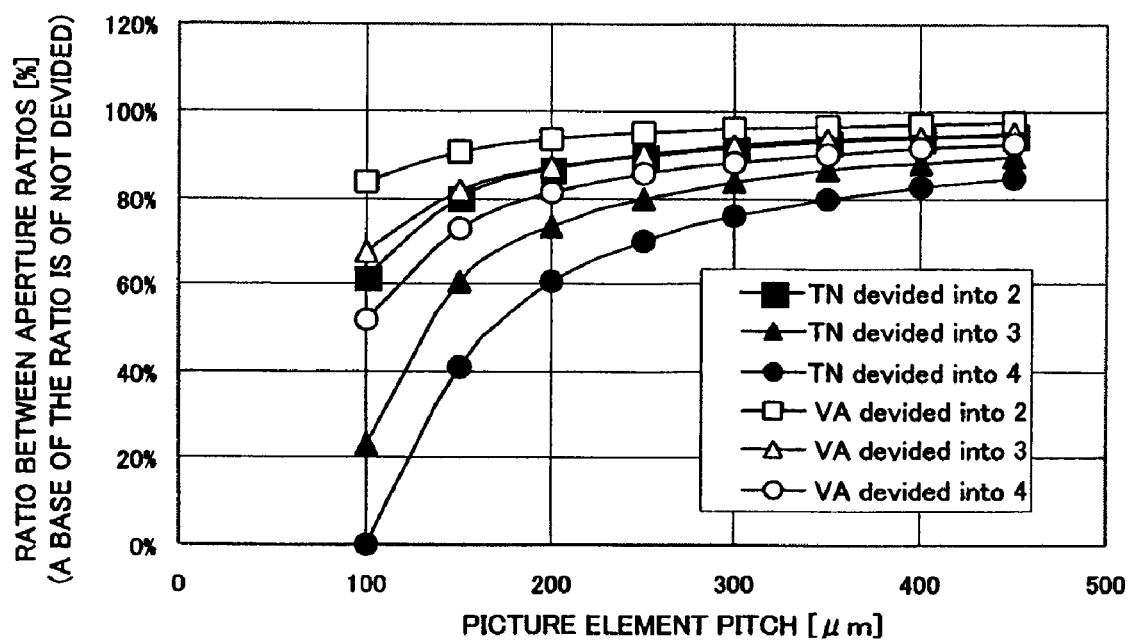
FIG. 10 is a view showing the relationship between the number of divisions of each picture element electrode, the picture element pitch, and the ratio between aperture ratios in TN liquid crystal display devices and VA liquid crystal display devices.

When voltages are applied to the sub picture element electrodes 116a to 116d as described above, the liquid crystal molecules tilted in directions orthogonal to the directions in which the protrusion 124 and the slits 117a extend. At this time, the tilted directions of the liquid crystal molecules are opposite on opposite sides of each of the protrusion 124 and the slits 117a. In the present embodiment, similar to the known liquid crystal display device shown in FIG. 4, four domains in which the orientations of the liquid crystal molecules are different from each other are formed.

Incidentally, in the boundary portions between the domains, transmittance becomes low because disturbances occur in the liquid crystal molecules. Further, in the case where each picture element electrode is divided into a plurality of sub picture element electrodes by slits, transmittance in slit portions becomes low because voltages are not applied to the slit portions.

Figure 13:
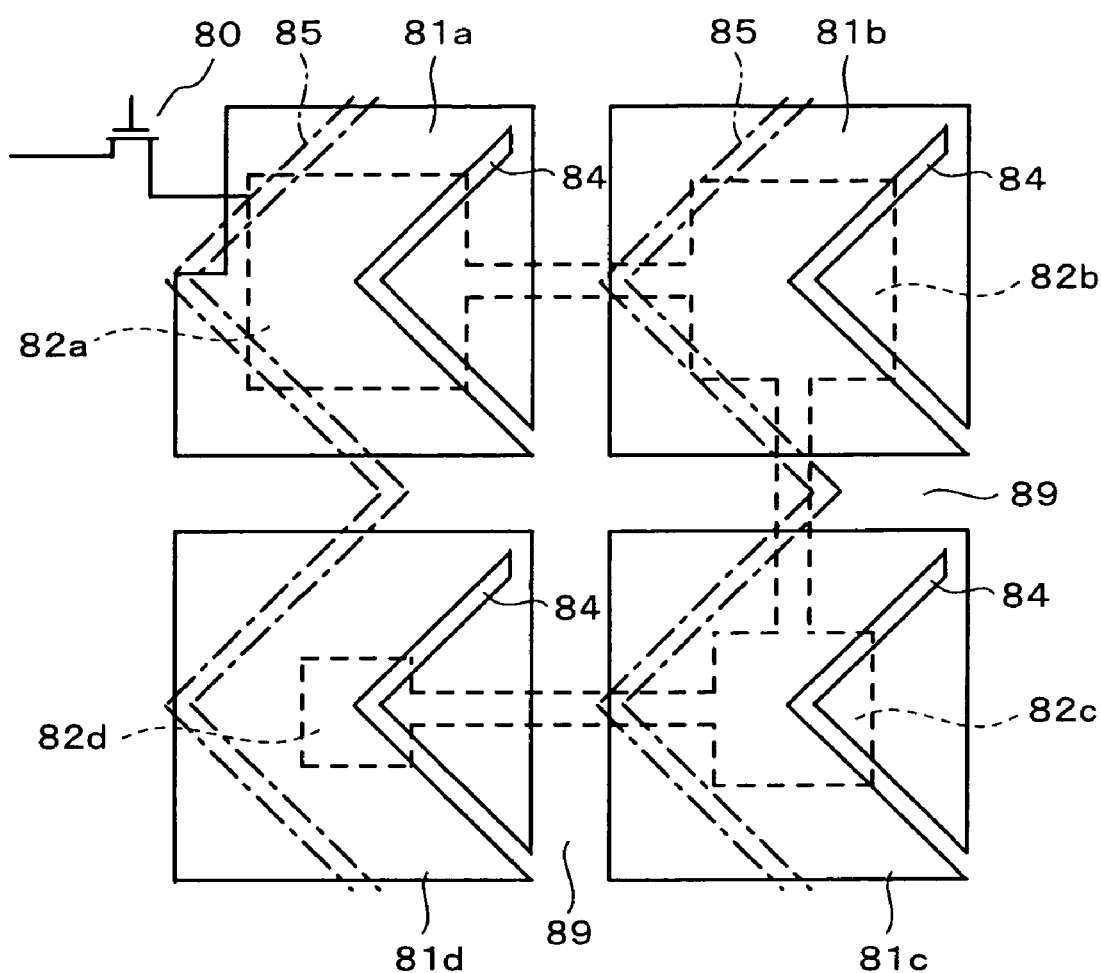
FIG. 13 is a schematic diagram showing an example of an MVA liquid crystal display device in which slits and protrusions are provided as domain regulation structures in addition to slits for isolating sub picture element electrodes.

FIG. 13 is a schematic diagram showing an example of an MVA liquid crystal display device in which slits 84 and protrusions 85 are provided as domain regulation structures in addition to a slit 89 for isolating sub picture element electrodes 81a to 81d. In this FIG. 13, the slits 84 are formed in the sub picture element electrodes 81a to 81d, respectively, and the protrusions 85 are formed on a counter substrate. Further, control electrodes 82a to 82d connected to a TFT 80 are formed under the sub picture element electrodes 81a to 81d, respectively.

In the liquid crystal display device of the present embodiment shown in FIGS. 11 and 12, the slits 117a isolating the sub picture element electrodes 116a to 116d function as domain regulation structures. Accordingly, there is little decrease in transmittance compared to the case where the slits 89 for isolating the sub picture element electrodes 81a to 81d and the slits 84 for orientation regulation are formed separately as shown in FIG. 13, and bright display can be performed.

Moreover, in the present embodiment, different voltages are applied to the pair of sub picture element electrodes 116a and 116d, the sub picture element electrode 116b, and the sub picture element electrode 116c, respectively. Accordingly, it appears that three regions having different thresholds of T-V characteristics exist in each picture element. This makes it possible to suppress the phenomenon (discolor) in which the screen looks whitish when viewed from an oblique direction, and to obtain favorable display quality.

Next, a method of manufacturing the liquid crystal display device of the present embodiment will be described. First, a method of manufacturing the TFT substrate will be described with reference to FIG. 12.

First, a metal film made of Cr (chromium) or a metal film having a laminate structure of Al (aluminum) and Ti (titanium) is formed on the substrate 110 made of a glass plate or the like by, for example, physical vapor deposition (PVD). Thereafter, this metal film is patterned by photolithography, thus forming the gate bus lines 111 and the auxiliary capacitance bus lines 112. It is noted that, in order to prevent the diffusion of impurities from the substrate 110, the metal film may be formed after the surface of the substrate 110 has been covered with an insulating film.

Next, silicon oxide or silicon nitride is deposited on the substrate 110 by, for example, chemical vapor deposition (CVD), thus forming the first insulating film 131 for covering the gate bus lines 111 and the auxiliary capacitance bus lines 112.

Subsequently, an amorphous silicon film (or polysilicon film) having a thickness of 20 to 100 nm and a silicon nitride film are sequentially formed on the first insulating film 131 by, for example, CVD. Then, the silicon nitride film is patterned by photolithography, thus forming channel protective films 134 for protecting the channels of the TFTs 114.

Thereafter, an ohmic contact layer made of amorphous silicon into which impurities are introduced at high density is formed on the entire upper surface of the substrate 110, and a metal film having a laminated structure of Ti—Al—Ti is formed thereon. Then, the metal film, the ohmic contact layer, and the amorphous silicon film are patterned by photolithography, thus determining semiconductor layers 111 serving as the active layers of the TFTs 114, and forming the data bus lines 115, the source electrodes 114s, the drain electrodes 114d, the control electrodes 113, and the interconnections 115a and 115b.

Next, silicon nitride is deposited on the entire upper surface of the substrate 110 by, for example, CVD, thus forming the second insulating film 132. Then, the contact holes 132a communicating with the interconnections 115a and the contact holes 132b communicating with the interconnections 115b are formed at predetermined positions in the second insulating film 132 by photolithography.

Subsequently, an ITO film is formed on the entire upper surface of the substrate 110 by sputtering or the like. This ITO film is electrically connected to the interconnections 115a and 115b through the contact holes 132a and 132b. Thereafter, the ITO film is patterned by photolithography, thus forming the sub picture element electrodes 116a to 116d. Then, the vertical alignment film 118 is formed by spreading polyimide over the surfaces of the sub picture element electrodes 116a to 116d. Thus, manufacturing of the TFT substrate is completed.

Next, a method of manufacturing the counter substrate will be described with reference to FIG. 12.

First, a metal film made of, for example, Cr or the like is formed on the substrate 120, and then, the metal film is patterned, whereby the black matrix 121 is formed at a position where the black matrix 121 faces the gate bus lines 111, the auxiliary capacitance bus lines 112, the data bus lines 115, and the TFTs 114 on the TFT substrate 110.

Next, the red, green, and blue color filters 122 are formed on the substrate 120 using, for example, red, green, and blue photosensitive resins. A color filter of any one color among red, green, and blue is placed in each picture element.

Thereafter, an ITO film is formed on the color filters 122 by sputtering, thus forming the common electrode 123. Then, the bank-like protrusions 124 made of dielectric material are formed on the common electrode 123 using, for example, photoresist.

Subsequently, the vertical alignment film 125 is formed by spreading polyimide over the surfaces of the common electrode 123 and the protrusions 124. Thus, the counter substrate is completed.

The TFT substrate and the counter substrate formed as described above are bonded together with spacers interposed therebetween, and the vertical alignment-type liquid crystals (liquid crystals with negative dielectric anisotropy) are filled into the space between the TFT substrate and the counter substrate. Thus, the liquid crystal display device of the present embodiment is completed.

As described above, in the liquid crystal display device of the present embodiment, the control electrodes 113 and the interconnections 115a and 115b can be formed simultaneously with the formation of the data bus lines 115, the source electrodes 114s, and the drain electrodes 114d. Accordingly, compared to known technologies, the liquid crystal display device of the present embodiment can be easily manufactured without an increase in the number of manufacturing steps.

Second Embodiment

Figure 14:
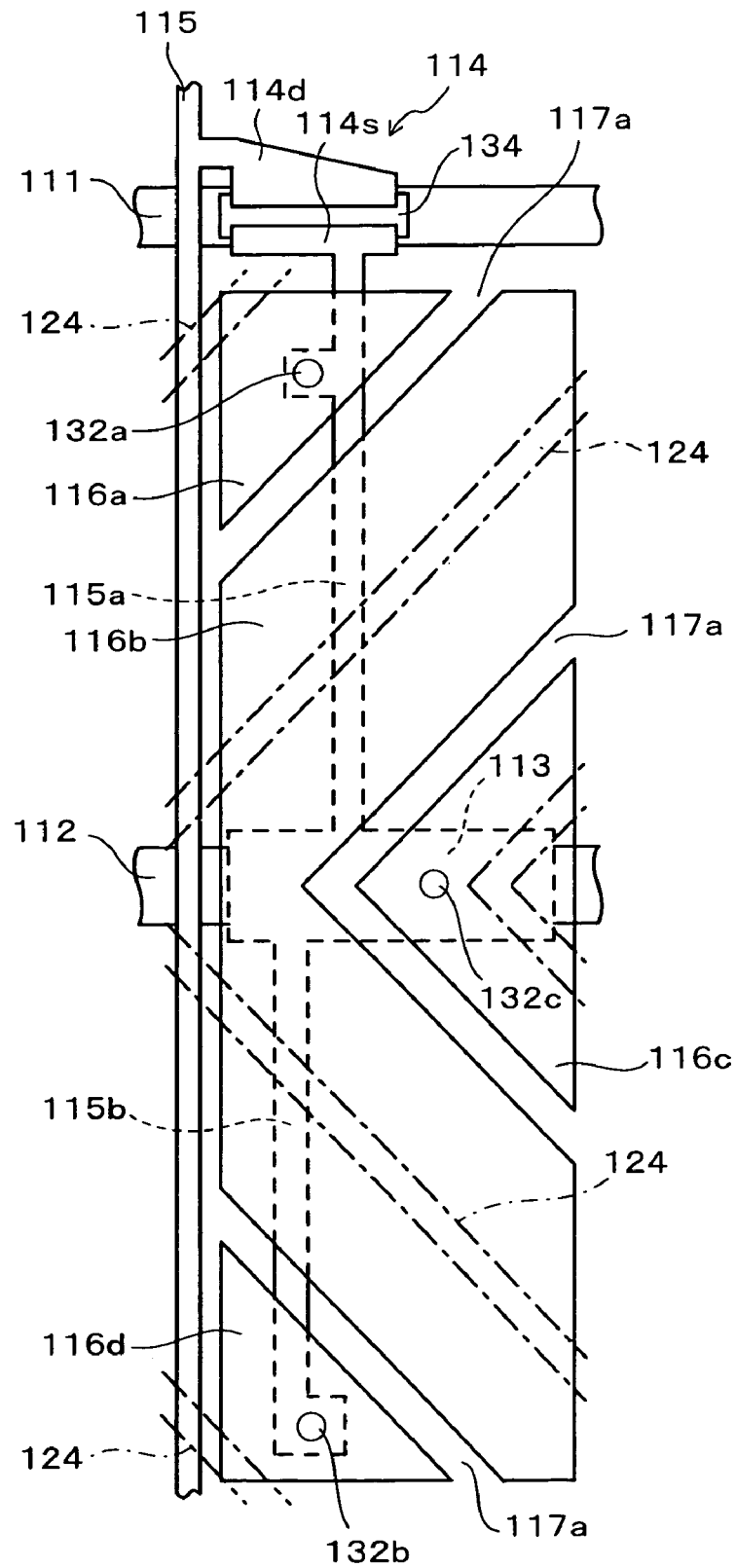
FIG. 14 is a plan view showing one picture element of a liquid crystal display device of a second embodiment of the present invention.

FIG. 14 is a plan view showing one picture element of a liquid crystal display device of a second embodiment of the present invention. In FIG. 14, the same components as those in FIG. 11 are denoted by the same reference numerals, and will not be further described in detail.

In the present embodiment, as shown in FIG. 14, the control electrode 113 and the sub picture element electrode 116c are electrically connected through a contact hole 132c formed in the second insulating film. Accordingly, if the voltage at the sub picture element electrode 116a is denoted by A, the voltage at the sub picture element electrode 116b is denoted by B, the voltage at the sub picture element electrode 116c is denoted by C, and the voltage at the sub picture element electrode 116d is denoted by D when a display voltage is supplied through the TFT 114, A=C=D>B is obtained.

In the first embodiment shown in FIG. 11, when a sufficiently high voltage is applied as a display voltage, the liquid crystal molecules are aligned with respective predetermined directions in the sub picture element regions defined by the sub picture element electrodes 116a to 116d, and four regions (four domains) in which the orientations of the liquid crystal molecules are different from each other are formed, thus obtaining favorable viewing angle characteristics. However, when the voltage (display voltage) of a display signal is low, e.g., when a voltage slightly higher than a threshold of T-V characteristics is applied to the sub picture element electrodes 116a and 116d but voltages lower than the threshold of T-V characteristics are applied to the sub picture element electrodes 116b and 116c, it is considered that the number of the orientations of the liquid crystal molecules becomes two (two domains), resulting in that viewing angle characteristics are deteriorated.

On the other hand, in the present embodiment, the same voltage as that for the sub picture element electrodes 116a and 116d is applied to the sub picture element electrode 116c. Accordingly, even when a display voltage is low, four regions (four domains) in which the orientations of the liquid crystal molecules are different from each other are formed. Thus, compared to the first embodiment, deterioration in viewing angle characteristics when brightness is low is avoided.

Moreover, the first embodiment shown in FIG. 11 has the disadvantage that the voltages at the sub picture element electrodes 116a, 116c, and 116d are changed by the parasitic capacitances between the data bus line 115 and the sub picture element electrodes 116a, 116c, and 116d, whereas the present embodiment has the advantage in eliminating such a disadvantage. The reason for this will be described below.

Figure 15:
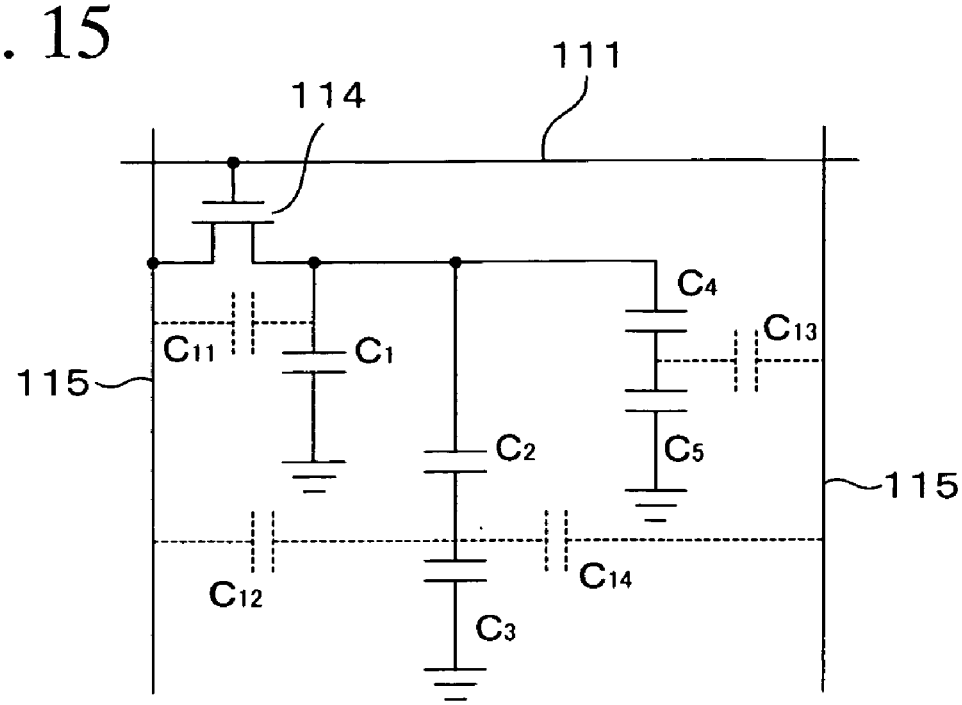
FIG. 15 is an equivalent circuit diagram of a picture element part of the liquid crystal display device of the first embodiment.

FIG. 15 is an equivalent circuit diagram of a picture element part of the liquid crystal display device of the first embodiment. In this FIG. 15, C1 denotes a capacitance formed by the sub picture element electrodes 116a and 116d and the common electrode, C2 denotes a capacitance formed by the control electrode 113 and the sub picture element electrode 116b, C3 denotes a capacitance formed by the sub picture element electrode 116b and the common electrode, C4 denotes a capacitance formed by the control electrode 113 and the sub picture element electrode 116c, and C5 denotes a capacitance formed by the sub picture element electrode 116c and the common electrode. Further, C11 denotes a parasitic capacitance between the data bus line 115 at the left and the sub picture element electrodes 116a and 116d, C12 denotes a parasitic capacitance between the data bus line 115 at the left and the sub picture element electrode 116*b*, C13 denotes a parasitic capacitance between the data bus line 115 at the right and the sub picture element electrode 116*c*, and C14 denotes a parasitic capacitance between the data bus line 115 at the right and the sub picture element electrode 116*b*.

In the liquid crystal display device of the first embodiment, since the left edges of the sub picture element electrodes 116*a* and 116*d* face the data bus line 115 at the left, the parasitic capacitance C11 occurs between the data bus line 115 at the left and the sub picture element electrodes 116*a* and 116*d*. Further, since the right edge of the sub picture element electrode 116*c* faces the data bus line 115 at the right, the parasitic capacitance C13 occurs between the sub picture element electrode 116*c* and the data bus line 115 at the right.

In general, in a liquid crystal display device, a display voltage supplied to odd-numbered data bus lines and that supplied to even-numbered data bus lines are opposite in polarity. Further, the polarity of a display voltage supplied to each data bus line is reversed for every one flame. In the liquid crystal display device of the first embodiment, in the case where the liquid crystal display device is driven as described above, a display voltage supplied to the data bus line 115 influences the voltages at the sub picture element electrodes 116*a*, 116*c*, and 116*d* through the parasitic capacitances C11 and C13, and the voltages at the sub picture element electrodes 116*a*, 116*d*, and 116*c* are changed.

Incidentally, in the sub picture element electrode 116*b*, the length of the edge facing the data bus line 115 at the left and the total length of the edges facing the data bus line 115 at the right are approximately equal to each other. Accordingly, in the case where display voltages in opposite polarities are applied to the data bus line 115 at the left and the data bus line 115 at the right, respectively, a change in voltage due to the influence of the data bus line 115 at the left is canceled by a change in voltage due to the influence of the data bus line 115 at the right. Consequently, the voltage at the sub picture element electrode 116*b* hardly changes.

Figure 16:
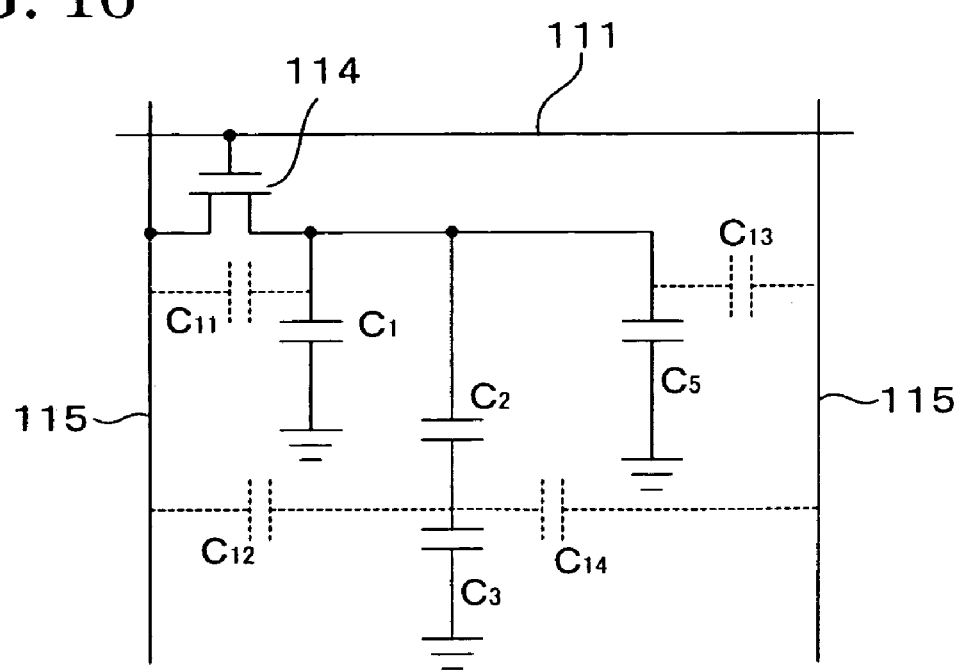
FIG. 16 is an equivalent circuit diagram of a picture element part of the liquid crystal display device of the second embodiment.

FIG. 16 is an equivalent circuit diagram of a picture element part of the liquid crystal display device of the second embodiment. In this FIG. 16, C1 denotes a capacitance formed by the sub picture element electrodes 116*a* and 116*d* and the common electrode, C2 denotes a capacitance formed by the control electrode 113 and the sub picture element electrode 116*b*, C3 denotes a capacitance formed by the sub picture element electrode 116*b* and the common electrode, and C5 denotes a capacitance formed by the sub picture element electrode 116*c* and the common electrode. Further, C11 denotes a parasitic capacitance between the data bus line 115 at the left and the sub picture element electrodes 116*a* and 116*d*, C12 denotes a parasitic capacitance between the data bus line 115 at the left and the sub picture element electrode 116*b*, C13 denotes a parasitic capacitance between the data bus line 115 at the right and the sub picture element electrode 116*c*, and C14 denotes a parasitic capacitance between the data bus line 115 at the right and the sub picture element electrode 116*b*.

As shown in this FIG. 16, in the present embodiment, the sub picture element electrodes 116*a*, 116*c*, and 116*d* are electrically connected to each other. Further, as shown in FIG. 14, the total length of the left edges of the sub picture element electrodes 116*a* and 116*d* which face the data bus line at the left and the length of the right edge of the sub picture element electrode 116*c* which faces the data bus line at the right are approximately equal to each other. Accordingly, in the case where display voltages of opposite polarities are applied to the data bus line at the left and the data bus line at the right, respectively, a change in voltage at the sub picture element electrodes 116*a*, 116*c*, and 116*d* due to the influence of the data bus line at the left is canceled by a change in voltage at the sub picture element electrodes 116*a*, 116*c*, and 116*d* due to the influence of the data bus line at the right. Consequently, the voltages at the sub picture element electrodes 116*a*, 116*c*, and 116*d* hardly change. Thus, the liquid crystal display device of the present embodiment has the effect that display quality more favorable than that of the first embodiment can be obtained, in addition to an effect similar to that of the first embodiment.

Incidentally, in the present embodiment, if S1 denotes the total area (total area of low-threshold regions) of the sub picture element electrodes 116*a*, 116*c*, and 116*d* connected to the TFT 114, V1 denotes a voltage applied to these sub picture element electrodes 116*a*, 116*c*, and 116*d*, S2 denotes the area (area of a high-threshold region) of the sub picture element electrode 116*b* capacitively coupled to the control electrode 113, and V2 denotes a voltage applied to the sub picture element electrode 116*b*, it is preferable, for example, that S1:S2 is set within a range of 1:9 to 6:4 and that V2/V1 is set within a range of 0.8 to 0.59. For example, S1:S2 is set to 4:6, and V2/V1 is set to 0.72.

Third Embodiment

Figure 17:
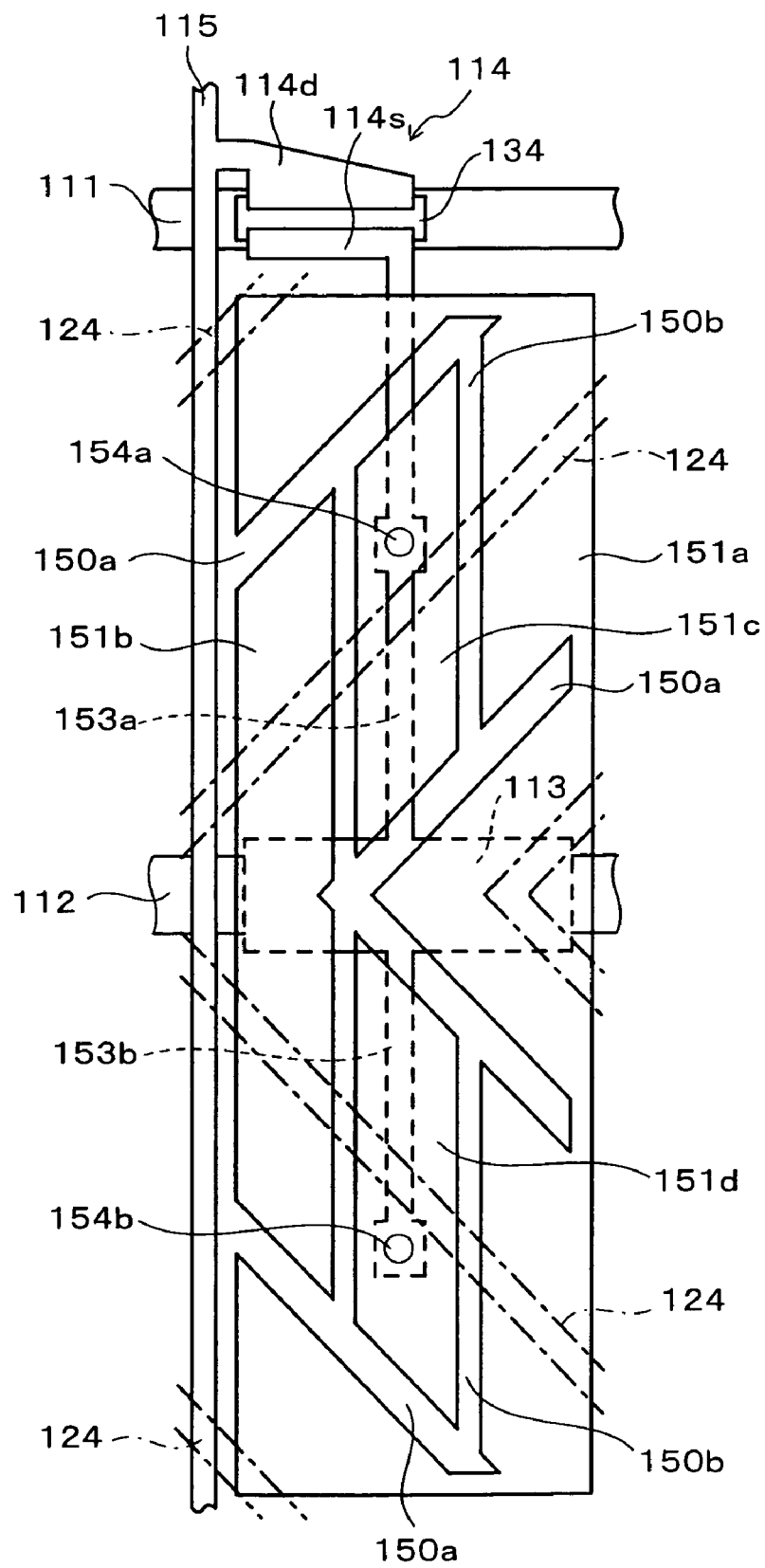
FIG. 17 is a plan view showing one picture element of a liquid crystal display device of a third embodiment of the present invention.

FIG. 17 is a plan view showing one picture element of a liquid crystal display device of a third embodiment of the present invention. The present embodiment differs from the first embodiment in that the shapes of sub picture element electrodes delimited by slits are different, but other components are basically the same as those of the first embodiment. Accordingly, in FIG. 17, the same components as those in FIG. 11 are denoted by the same reference numerals, and will not be further described in detail.

In the present embodiment, as shown in FIG. 17, a picture element electrode is divided into four sub picture element electrodes 151*a*, 151*b*, 151*c*, and 151*d* by slits 150*a* extending obliquely and slits 150*b* extending vertically. The sub picture element electrode 151*a* is horizontal-line symmetric. The shape of the sub picture element electrode 151*a* and the position thereof relative to the protrusion 124 are determined so that four regions (four domains) in which the orientations of the liquid crystal molecules are different from each other when a voltage is applied are formed and that the sizes of these regions become approximately equal to each other. Further, the sub picture element electrode 151*a* is capacitively coupled to the control electrode 113 through the second insulating film.

The sub picture element electrode 151*b* is also formed with a horizontal-line symmetric. The shape of the sub picture element electrode 151*b* and the position thereof relative to the protrusion 124 are determined so that four regions (four domains) in which the orientations of the liquid crystal molecules are different from each other when a voltage is applied are formed and that the sizes of these regions become approximately equal to each other. Further, the sub picture element electrode 151*b* is also capacitively coupled to the control electrode 113 through the second insulating film. However, in the present embodiment, the sizes of the sub picture element electrodes 151*a* and 151*b* and the amount of overlap between each sub picture element electrode 151*a* or 151*b* and the control electrode 113 are set so that the voltage at the sub picture element electrode 151*b* becomes higher than that at the sub picture element electrode 151*a* when a voltage is applied to the control electrode 113.

The sub picture element electrodes 151c and 151d are horizontal-line symmetrically placed across the auxiliary capacitance bus line 112. Under these sub picture element electrodes 151c and 151d, interconnections 153a and 153b connected to the source electrode 114s of the TFT 114 and the control electrode 113 are formed. The sub picture element electrode 151c is connected to the interconnection 153a through a contact hole 154a, and the sub picture element electrode 151d is connected to the interconnection 153b through a contact hole 154b. The shapes of these sub picture element electrodes 151c and 151d and the positions thereof relative to the protrusion 124 are also determined so that four regions (four domains) in which the orientations of the liquid crystal molecules are different from each other when a voltage is applied are formed and that the sizes of these regions become approximately equal to each other.

Compared to the liquid crystal display device of the second embodiment shown in FIG. 14, the liquid crystal display device of the present embodiment has the following advantage. Specifically, in the second embodiment, when a display voltage is supplied, the voltages at three (sub picture element electrodes 116a, 116c, and 116d) of the four sub picture element electrodes 116a to 116d become equal to each other. Accordingly, in the liquid crystal display device of the second embodiment, only two regions having different thresholds of T-V characteristics exist in each picture element, and the effect of suppressing discolor is small compared to the first embodiment. On the other hand, in the present embodiment, when a display voltage is supplied, the voltage at the sub picture element electrode 151a, the voltage at the sub picture element electrode 151b, and the voltage at the sub picture element electrodes 151c and 151d are different from each other. That is, in the present embodiment, three regions having different thresholds of T-V characteristics exist in each picture element. Accordingly, similar to the first embodiment, the effect of suppressing discolor is large in the liquid crystal display device of the present embodiment.

Moreover, in the present embodiment, for each of the sub picture element electrode 151a, the sub picture element electrode 151b, and the pair of the sub picture element electrodes 151c and 151d, the shape or shapes and the position or positions thereof are determined so that four regions (four domains) in which the orientations of the liquid crystal molecules when a voltage is applied are different from each other are formed. Accordingly, even if a display voltage is low, viewing angle characteristics are not deteriorated, unlike the first embodiment.

Incidentally, in the present embodiment, if S1 denotes the total area (total area of low-threshold regions) of the sub picture element electrodes 151c and 151d, S2 denotes the area (area of an intermediate-threshold region) of the sub picture element electrode 151b, and S3 denotes the area (area of a high-threshold region) of the sub picture element electrode 151a, it is preferable, for example, that the ratio S1:S2:S3 between these areas is set to 1:2:7, 2:2:6, or the like.

Fourth Embodiment

Figure 18:
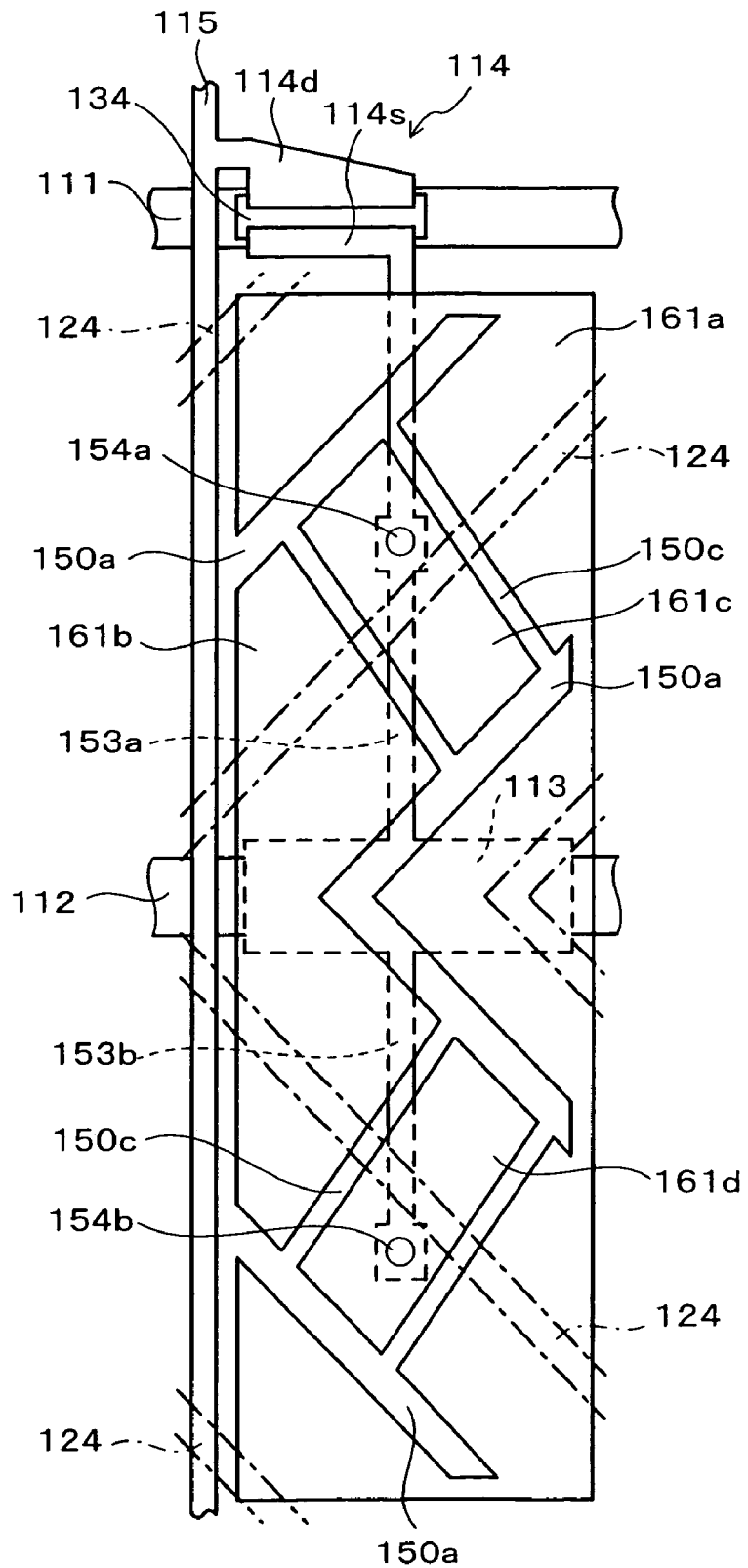
FIG. 18 is a plan view showing one picture element of a liquid crystal display device of a fourth embodiment of the present invention.

FIG. 18 is a plan view showing one picture element of a liquid crystal display device of a fourth embodiment of the present invention. The present embodiment differs from the third embodiment shown in FIG. 17 in that the shapes of sub picture element electrodes delimited by slits are different, but other components are basically the same as those of the third embodiment. Accordingly, in FIG. 18, the same components as those in FIG. 17 are denoted by the same reference numerals, and will not be further described in detail.

In the present embodiment, as shown in FIG. 18, a picture element electrode is divided into four sub picture element electrodes 161a, 161b, 161c, and 161d by slits 150a and 150c extending obliquely. Each of the sub picture element electrodes 161a and 161b is horizontal-line symmetric. The shape of each sub picture element electrode 161a or 161b and the position thereof relative to the protrusion 124 are determined so that four regions (four domains) in which the orientations of the liquid crystal molecules are different from each other when a voltage is applied are formed and that the sizes of these regions become approximately equal to each other. Further, these sub picture element electrodes 161a and 161b are capacitively coupled to the control electrode 113 through the second insulating film.

The sub picture element electrodes 161c and 161d are horizontal-line symmetrically placed across the auxiliary capacitance bus line 112. Under these sub picture element electrodes 161c and 161d, the interconnections 153a and 153b connected to the source electrode 114s of the TFT 114 and the control electrode 113 are formed. The sub picture element electrode 161c is connected to the interconnection 153a through the contact hole 154a, and the sub picture element electrode 161d is connected to the interconnection 153b through the contact hole 154b. The shapes of these sub picture element electrodes 161c and 161d and the positions thereof relative to the protrusion 124 are also determined so that four regions (four domains) in which the orientations of the liquid crystal molecules are different from each other when a voltage is applied are formed and that the sizes of these regions become approximately equal to each other.

Figure 19A:
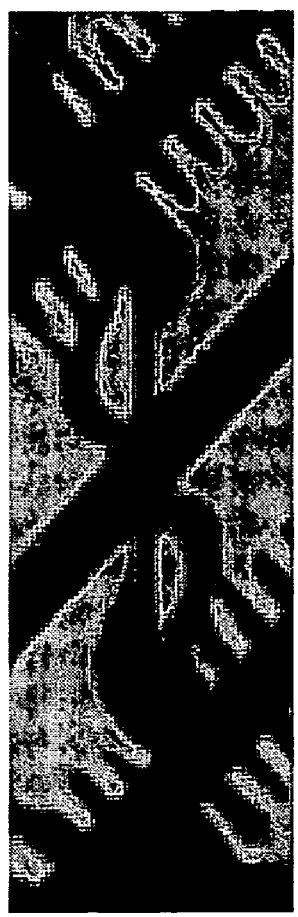
FIG. 19A is a light transmission view showing the transmission state of light in a portion of the liquid crystal display device of the third embodiment.

Compared to the liquid crystal display device of the third embodiment shown in FIG. 17, the present embodiment has the following advantage. Specifically, in the liquid crystal display device of the third embodiment, the slits 150b intersect the slits 150a and the protrusion 124, which are domain regulation structures, at an angle of approximately 45°. In the case where such slits exist, disturbances occur in the orientations of the liquid crystal molecules, and portions with low transmittance occur as shown in the light transmission view of FIG. 19A.

Figure 19B:
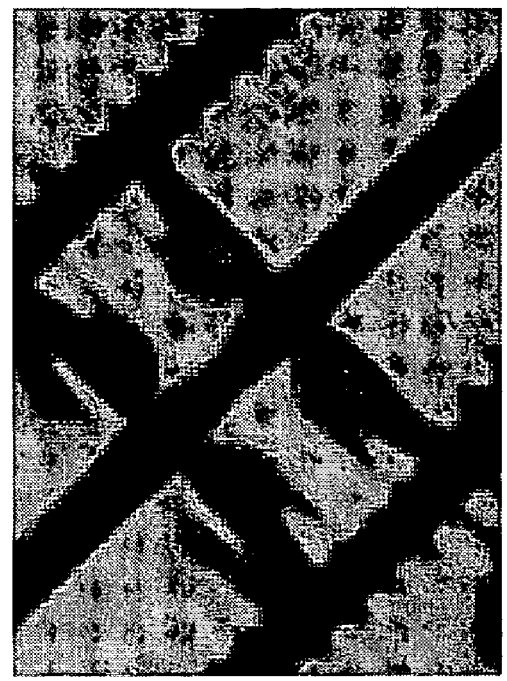
FIG. 19B is a light transmission view showing the transmission state of light in the portion of the liquid crystal display device of the fourth embodiment which corresponds to FIG. 19A.

On the other hand, in the present embodiment, there are no slits intersecting the slits 150a and the protrusion 124, which are domain regulation structures, at an angle of approximately 45°, and the slits 150c are formed approximately perpendicular to the slits 150a. In this case, as shown in the light transmission view of FIG. 19B, disturbances in the liquid crystal molecules are reduced, and a decrease in transmittance is suppressed. Thus, the liquid crystal display device of the present embodiment has the effect that display brighter than that in the liquid crystal display device of the third embodiment can be performed, in addition to an effect similar to that of the third embodiment.

Fifth Embodiment

Figure 20:
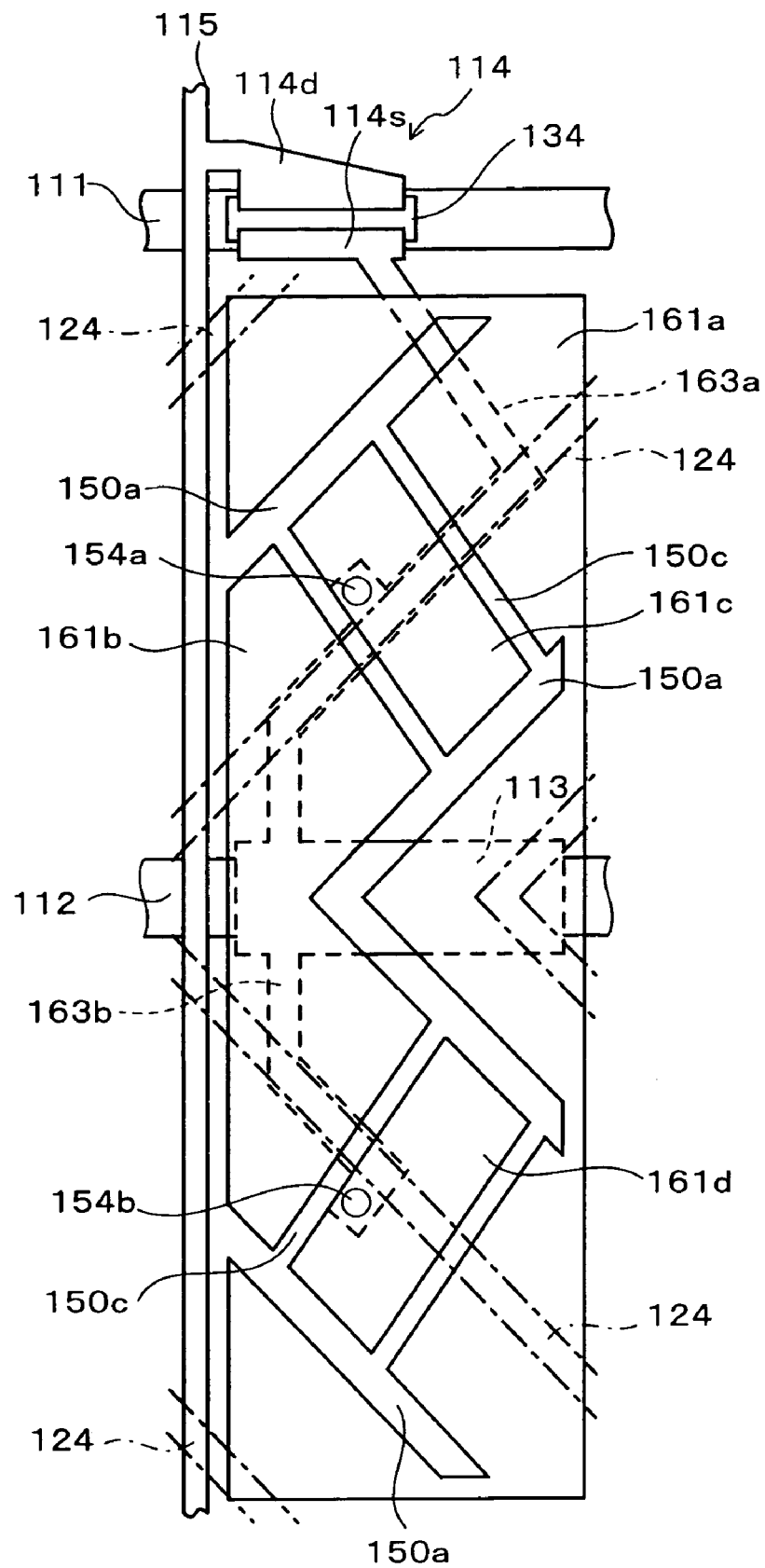
FIG. 20 is a plan view showing one picture element of a liquid crystal display device of a fifth embodiment of the present invention.

FIG. 20 is a plan view showing one picture element of a liquid crystal display device of a fifth embodiment of the present invention. The present embodiment differs from the fourth embodiment shown in FIG. 18 in that the pattern shapes of interconnections are different, but other components are basically the same as those of the fourth embodiment. Accordingly, in FIG. 20, the same components as those in FIG. 18 are denoted by the same reference numerals, and will not be further described in detail.

An interconnection 163a includes a portion extending from the source electrode 114s toward the protrusion 124 in an oblique direction (direction approximately perpendicular to the protrusion 124), a portion extending along the protrusion 124, and a portion extending parallel to the data bus line 115 toward the control electrode 113. Further, the interconnection 163*a* is electrically connected to the sub picture element electrode 161*c* through the contact hole 154*a* at the portion extending along the protrusion 124. Meanwhile, an interconnection 163*b* includes a portion extending parallel to the data bus line 115 from the control electrode 113 toward the protrusion 124 and a portion extending along the protrusion 124. Further, the interconnection 163*b* is electrically connected to the sub picture element electrode 161*d* through the contact hole 154*b* at the tip of the portion extending along the protrusion 124.

In the liquid crystal display device of the fourth embodiment shown in FIG. 18, in the portions of the interconnections 153*a* and 153*b* which are exposed through the slits 150*a* and 150*b*, disturbances in the orientations of the liquid crystal molecules occur under the influence of electric flux lines occurring from the interconnections 153*a* and 153*b*. Thus, portions with low transmittance will be resulted.

On the other hand, in the present embodiment, the interconnections 163*a* and 163*b* are placed along the protrusion 124 as described previously. The protrusion 124 serves as boundaries between domains, and is a portion with low transmittance originally. Accordingly, a decrease in transmittance in the portions in which the interconnections 163*a* and 163*b* are exposed through the slits 150*c* can be avoided by placing the interconnections 163*a* and 163*b* along the protrusion 124 as shown in FIG. 20. Thus, the liquid crystal display device of the present embodiment has the effect that display brighter than that in the fourth embodiment can be performed, in addition to an effect similar to that of the fourth embodiment.

Sixth Embodiment

Figure 21:
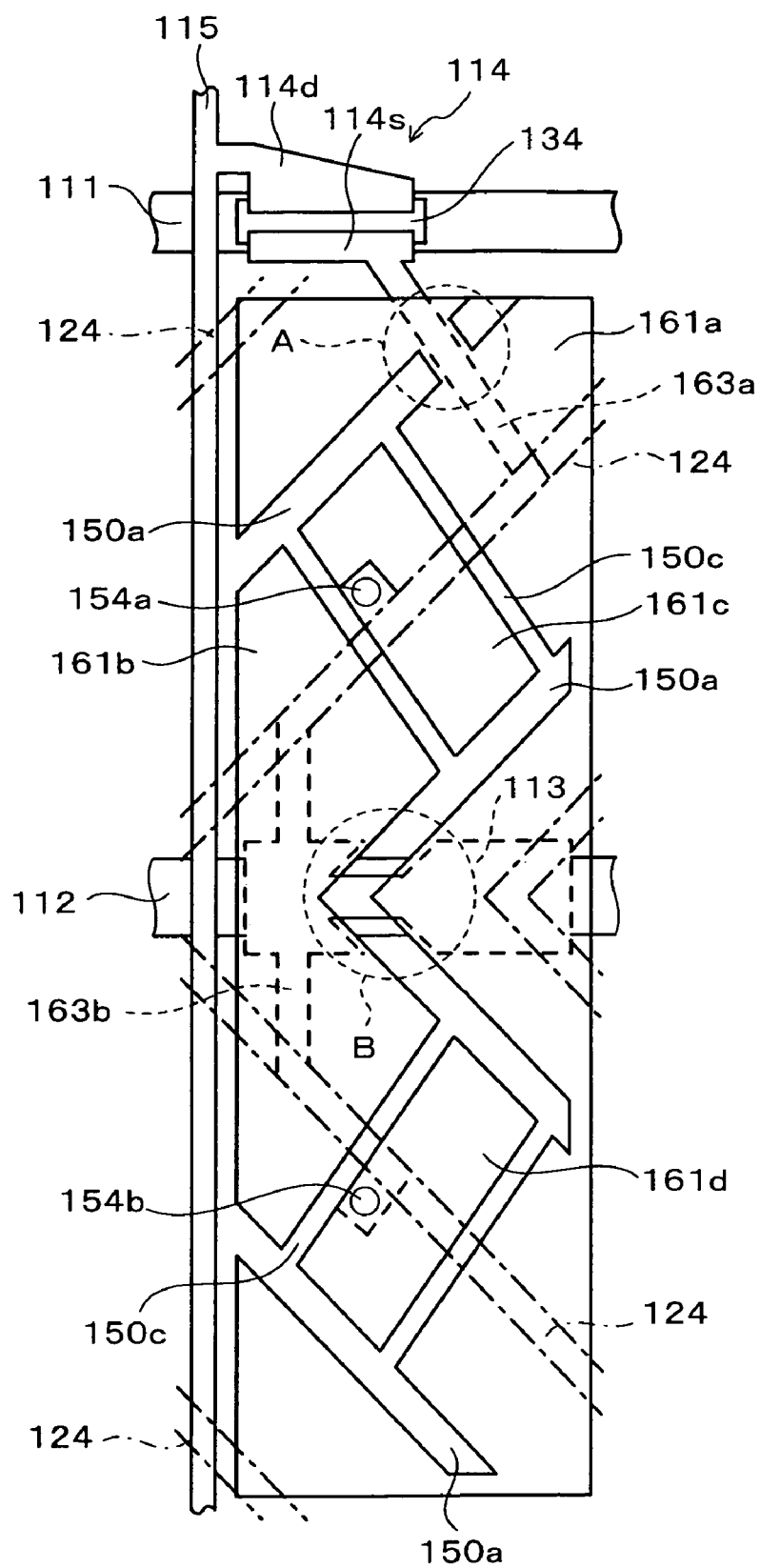
FIG. 21 is a plan view showing one picture element of a liquid crystal display device of a sixth embodiment of the present invention.
Figure 22:
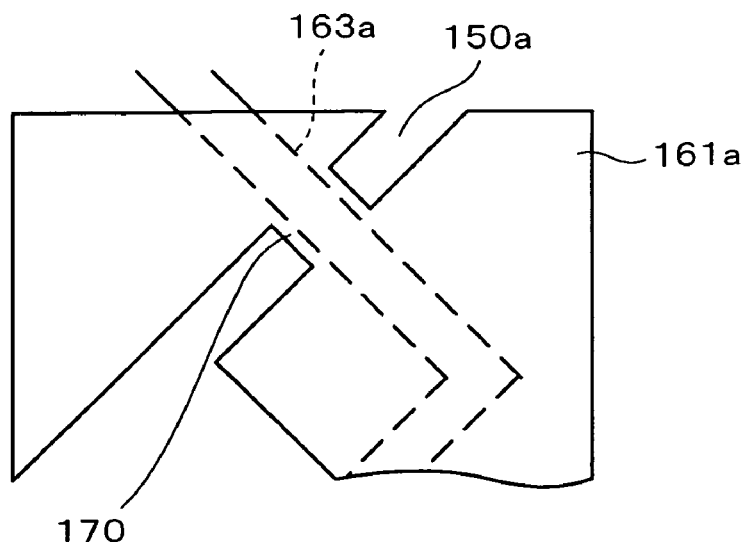
FIG. 22 is a schematic diagram showing the portion surrounded by the dashed-line circle A in FIG. 21 under magnification.
Figure 23:
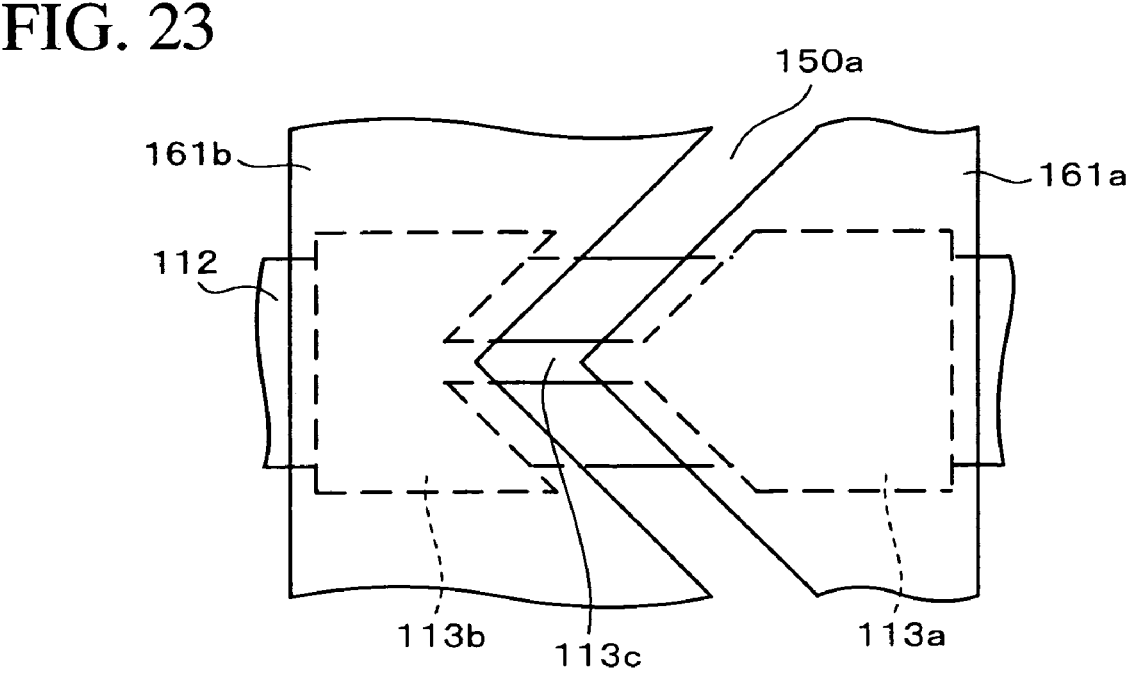
FIG. 23 is a schematic diagram showing the portion surrounded by the dashed-line circle B in FIG. 21 under magnification.

FIG. 21 is a plan view showing one picture element of a liquid crystal display device of a sixth embodiment of the present invention. FIG. 22 is a schematic diagram showing the portion surrounded by the dashed-line circle A in FIG. 21 under magnification, and FIG. 23 is a schematic diagram showing the portion surrounded by the dashed-line circle B in FIG. 21 under magnification. It is noted that, in FIG. 21, the same components as those in FIG. 20 are denoted by the same reference numerals, and will not be further described in detail.

In the present embodiment, as shown in FIG. 22, an ITO film 170 for covering the interconnection 163*a* is formed in the intersection of the slit 150*a* and the interconnection 163*a*. This ITO film 170 constitutes part of the sub picture element electrode 161*a*. Thus, electric flux lines occurring from the interconnection 163*a* can be shielded to prevent disturbances in the liquid crystal molecules by covering the exposed portion of the interconnection 163*a* with the ITO film 170. FIG. 24A is a light transmission view for the intersection of the slit 150*a* and the interconnection 163*a* in the liquid crystal display device (the case where there is no ITO film 170) of the fifth embodiment, and FIG. 24B is a light transmission view for the intersection of the slit 150*a* and the interconnection 163*a* in the liquid crystal display device (the case where there is the ITO film 170) of the present embodiment. From these FIGS. 24A and 24B, it can be seen that, in the present embodiment, light transmittance in the intersection of the slit 150*a* and the interconnection 163*a* is improved compared to the fifth embodiment.

Moreover, in the present embodiment, as shown in FIG. 23, a control electrode 113*a* capacitively coupled to the sub picture element electrode 161*a* and a control electrode 113*b* capacitively coupled to the sub picture element electrode 161*b* are connected using an interconnection 113*c* narrower than the auxiliary capacitance bus line 112. In the control electrode 113 shown in FIG. 20, since the control electrode 113 is exposed through the slit 150*a*, electric flux lines occurring from the control electrode 113 disturb the orientations of the liquid crystal molecules, and transmittance decreases as shown in the light transmission view of FIG. 25A.

On the other hand, in the present embodiment, the edges of the interconnection 113*c* for connecting the control electrodes 113*a* and 113*b* are placed over the auxiliary capacitance bus line 112. Since the auxiliary capacitance bus line 112 is generally held at ground potential, electric flux lines occurring from the interconnection 113*c* are absorbed by the auxiliary capacitance bus line 112, and disturbances in the orientations of the liquid crystal molecules are suppressed. FIG. 25B is a light transmission view for the intersection of the control electrode 113 and the slit 150*a* in the present embodiment. From FIGS. 25A and 25B, it can be seen that, in the present embodiment, light transmittance in the vicinity of the control electrode 113 is improved compared to the fifth embodiment.

Seventh Embodiment

Figure 26:
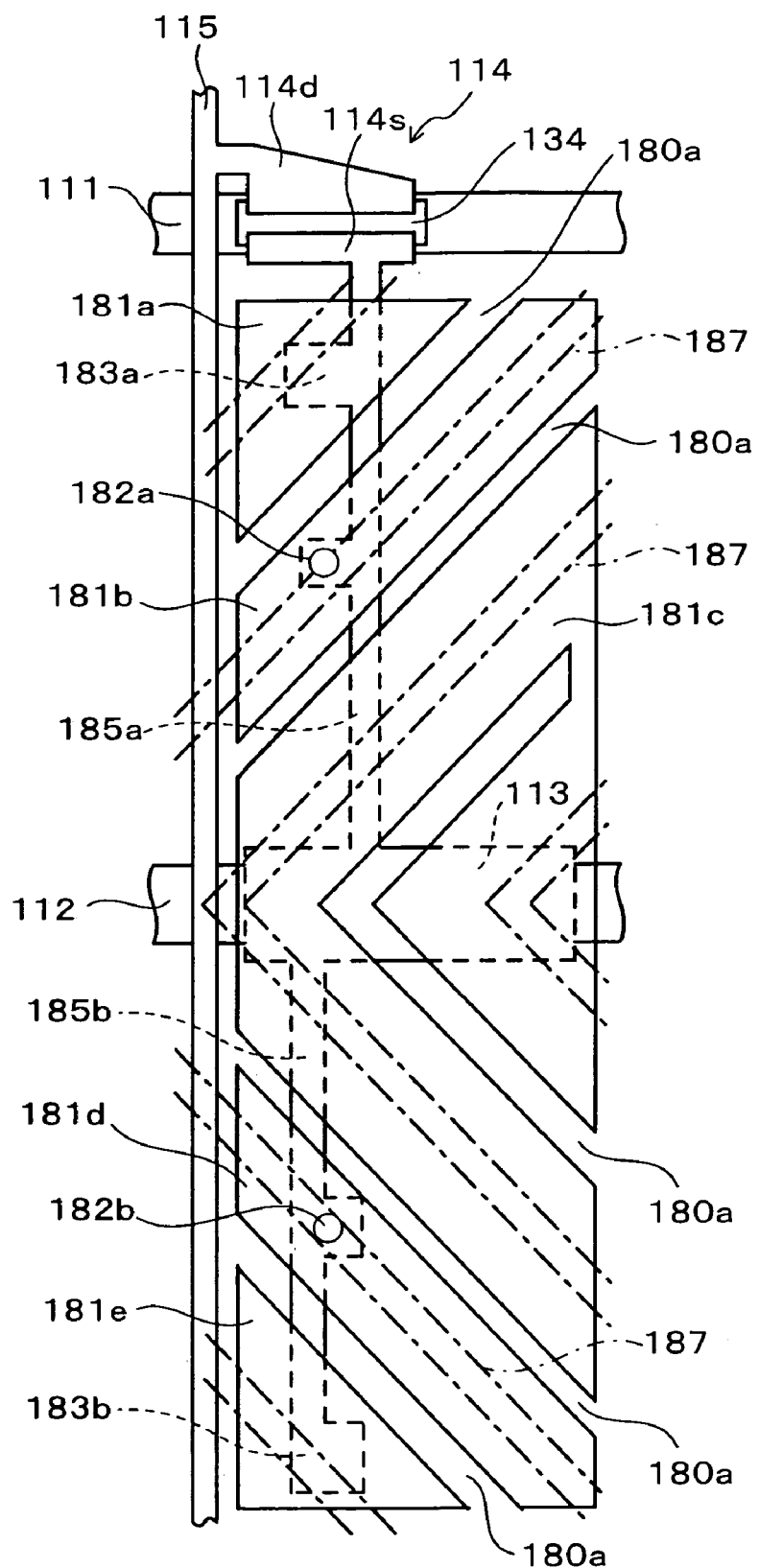
FIG. 26 is a plan view showing one picture element of a liquid crystal display device of a seventh embodiment of the present invention.

FIG. 26 is a plan view showing one picture element of a liquid crystal display device of a seventh embodiment of the present invention. The present embodiment differs from the first embodiment shown in FIG. 11 in that the shapes of sub picture element electrodes delimited by slits and the pattern shapes of protrusions formed on the counter substrate are different, but other components are basically the same as those of the first embodiment. Accordingly, in FIG. 26, the same components as those in FIG. 11 are denoted by the same reference numerals, and will not be further described in detail.

In the present embodiment, a picture element electrode is divided into five sub picture element electrodes 181*a* to 181*e* by slits 180*a* extending obliquely. The sub picture element electrodes 181*a* and 181*e* are horizontal-line symmetrically placed across the auxiliary capacitance bus line 112. Under the sub picture element electrode 181*a*, a control electrode 183*a* having a rectangular shape is formed with the second insulating film interposed therebetween, and the sub picture element electrode 181*a* is capacitively coupled to the control electrode 183*a*. This control electrode 183*a* is electrically connected to an interconnection 185*a* extending from the source electrode 114*s* to the control electrode 113.

Moreover, under the sub picture element electrode 181*e*, a control electrode 183*b* having a rectangular shape is formed with the second insulating film interposed therebetween, and the sub picture element electrode 181*e* is capacitively coupled to the control electrode 183*b*. This control electrode 183*b* is electrically connected to an interconnection 185*b* extending from the control electrode 113. For these sub picture element electrodes 181*a* and 181*e*, the shapes thereof and the position of a protrusion 187 are determined so that four regions (two regions for each of the sub picture element electrodes 181*a* and 181*e*) in which the orientations of the liquid crystal molecules are different from each other when a voltage is applied are formed and that the sizes of these regions become approximately equal to each other.

The sub picture element electrodes 181*b* and 181*d* are also horizontal-line symmetrically placed across the auxiliary capacitance bus line 112. The sub picture element electrode 181*b* is electrically connected to the interconnection 185*a* through a contact hole 182*b*. Further, the sub picture element electrode 181d is electrically connected to the interconnection 185b through a contact hole 182c. For these sub picture element electrodes 181b and 181d, the shapes thereof and the position of a protrusion 187 are also determined so that four regions (two regions for each of the sub picture element electrodes 181b and 181d) in which the orientations of the liquid crystal molecules are different from each other when a voltage is applied are formed and that the sizes of these regions become approximately equal to each other.

The sub picture element electrode 181c is capacitively coupled to the control electrode 113. For the sub picture element electrode 181c, the shape thereof and the position of a protrusion 187 are also determined so that four regions in which the orientations of the liquid crystal molecules are different from each other when a voltage is applied are formed and that the sizes of these regions become approximately equal to each other.

In the present embodiment, if the voltage at the sub picture element electrode 181a is denoted by A, that at the sub picture element electrode 181b is denoted by B, that at the sub picture element electrode 181c is denoted by C, and that at the sub picture element electrode 181d is denoted by D when a display voltage is supplied, B=D>A=E>C is obtained.

Figure 27:
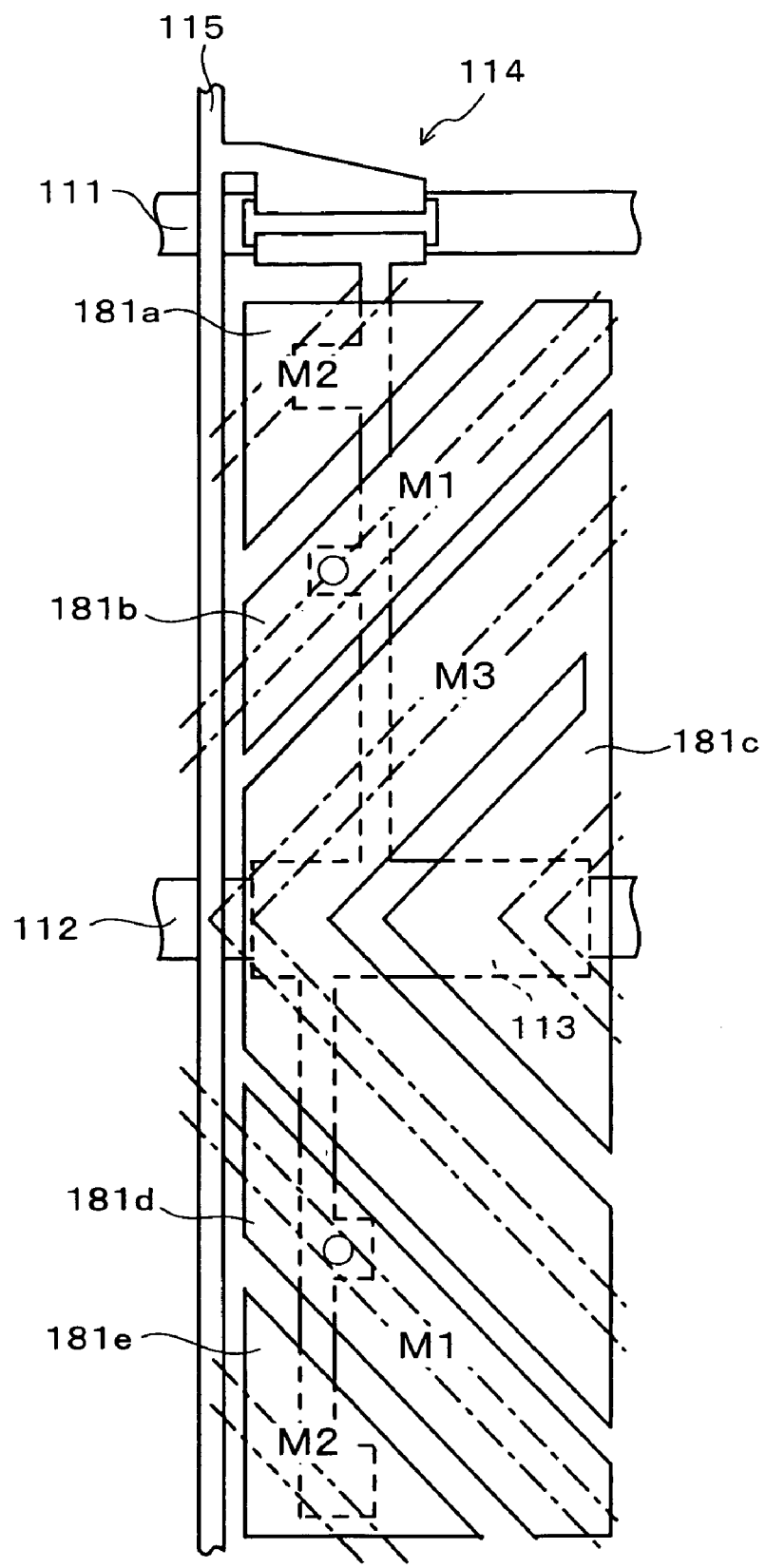
FIG. 27 is a plan view for explaining the area ratio between sub picture element electrodes.

In the present embodiment, it is possible to easily optimize the area ratio between the three regions having different thresholds of T-V characteristics. For example, as shown in FIG. 27, the total area of the sub picture element electrodes 181b and 181d is denoted by M1, the total area of the sub picture element electrodes 181a and 181e is denoted by M2, and the area of the sub picture element electrode is denoted by M3. In a liquid crystal display device having a certain size, an experiment has revealed that discolor is minimized when the area ratio M1:M2:M3 is 1:2:7 (M1:M2:M3=1:2:7). In this case, if the widths of the protrusions 187 are set to 10 μm, the widths of the slits 180a are set to 10 μm, and the intervals between the protrusions and the slits are respectively set to 3 μm, 7 μm, and 25 μm for the pair of the sub picture element electrodes 181b and 181d, the pair of the sub picture element electrodes 181a and 181e, and the sub picture element electrode 181c, the area ratio M1:M2:M3 becomes approximately 1:2:7. Thus, in the present embodiment, the area ratio between the sub picture element electrodes 181a to 181e can be easily set to a predetermined ratio only by setting the intervals between the protrusions 187 and the slits 180a.

Figure 28:
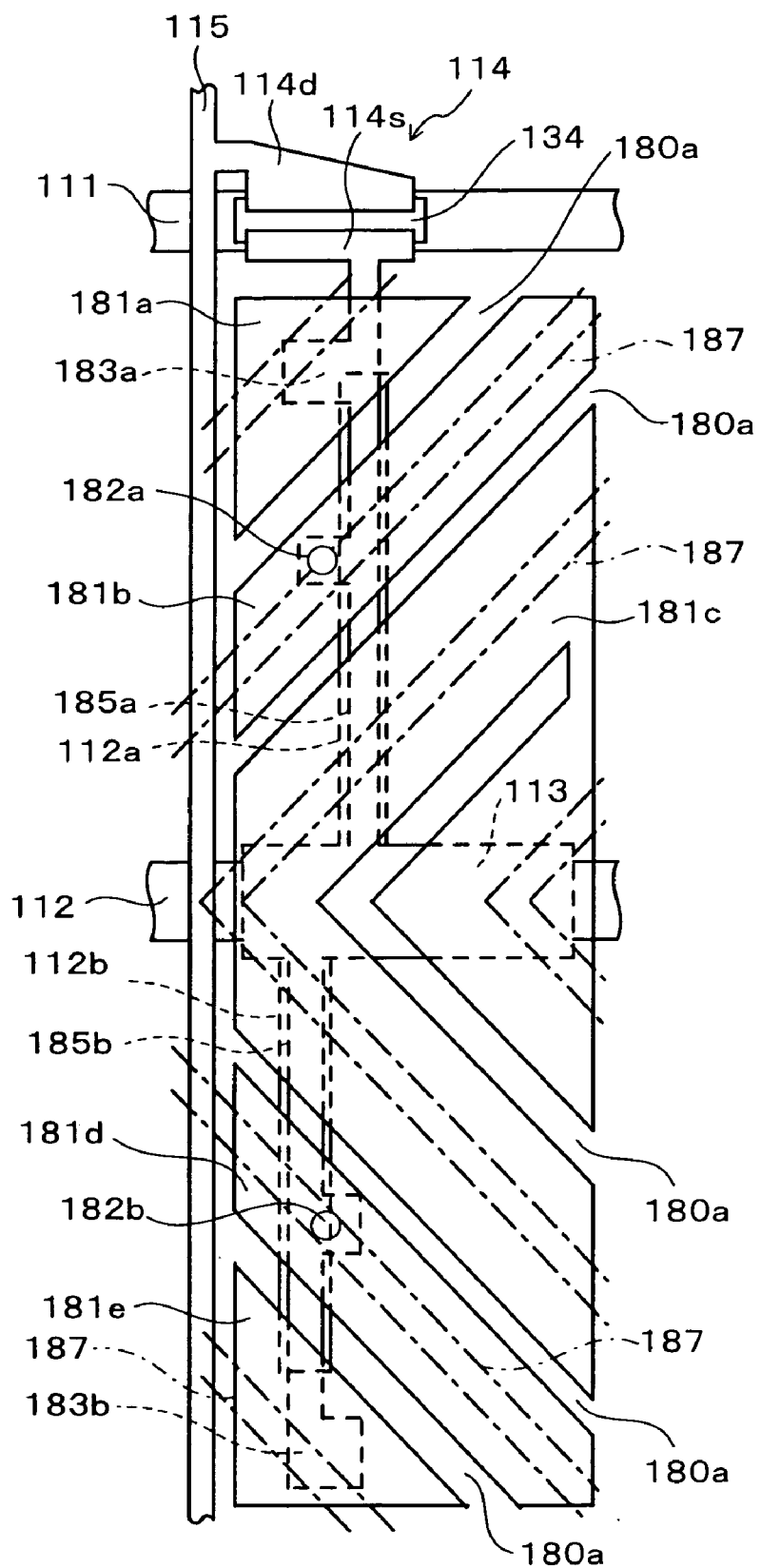
FIG. 28 is a plan view showing one picture element of a liquid crystal display device of modification 1 of the seventh embodiment.

FIG. 28 is a plan view showing one picture element of a liquid crystal display device of modification 1 of the seventh embodiment. In this modification 1, conductive patterns 112a and 112b extending from the auxiliary capacitance bus line 112 are provided under the interconnections 185a and 185b. Electric flux lines occurring from the interconnections 185a and 185b are absorbed by these conductive patterns 112a and 112b, and it is possible to suppress disturbances in the orientations of the liquid crystal molecules in the portions in which the interconnections 185a and 185b are exposed through the slits 180a.

Figure 29:
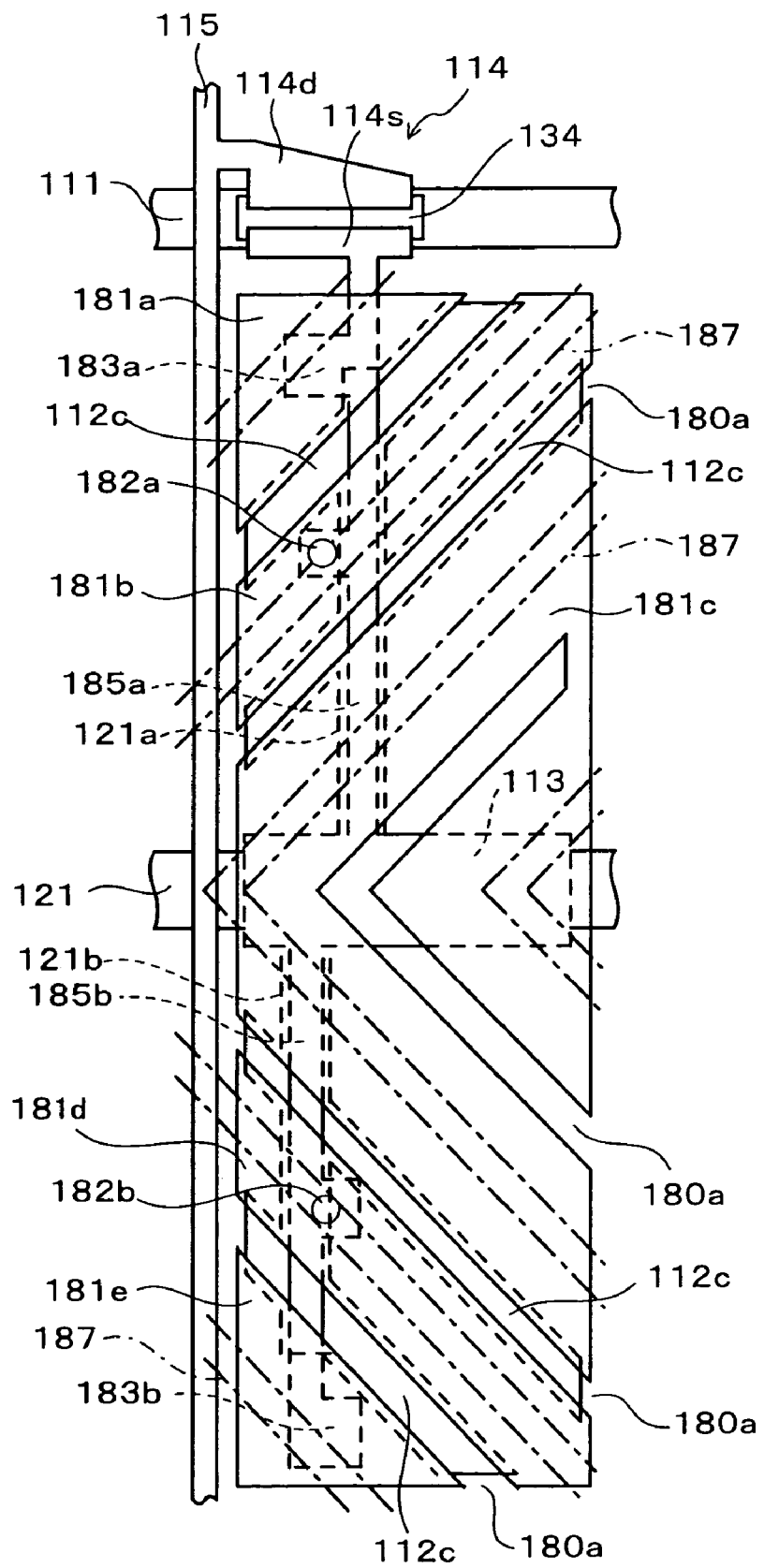
FIG. 29 is a plan view showing one picture element of a liquid crystal display device of modification 2 of the seventh embodiment.

FIG. 29 is a plan view showing one picture element of a liquid crystal display device of modification 2 of the seventh embodiment. In this modification 2, conductive patterns 112c connected to the auxiliary capacitance bus line 112 are further formed under the slits 180a. Since the portions under the slits 180a are held at ground potential by these conductive patterns 112c, it is possible to more reliably prevent light transmission in the portions corresponding to the slits 180a.

Other Embodiments

Figure 30:
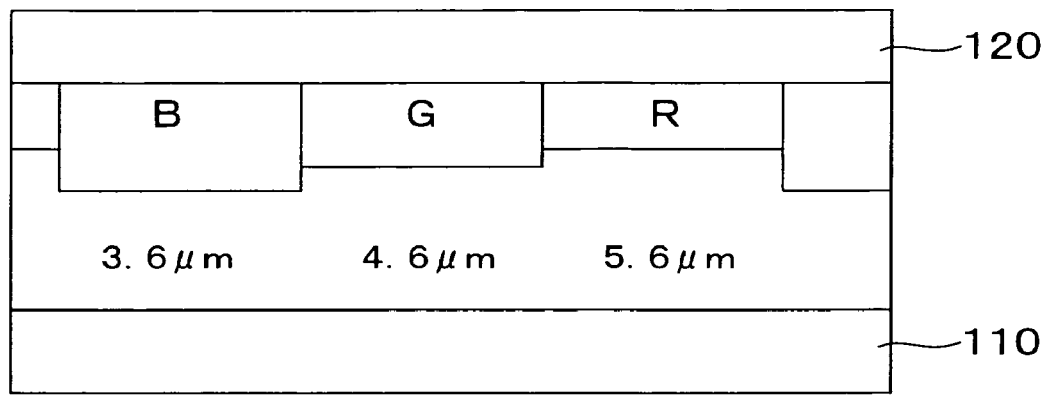
FIG. 30 is a schematic diagram showing a liquid crystal display device having a multi-gap structure in which the cell gaps of red (R), green (G), and blue (B) picture elements are different from each other.
Figure 31:
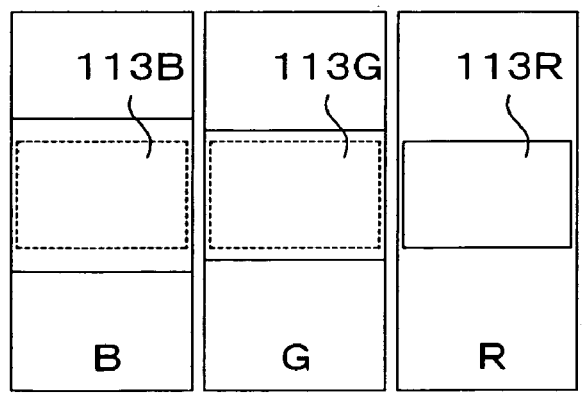
FIG. 31 is a schematic diagram showing a liquid crystal display device in which the sizes of control electrodes are set in accordance with cell gaps.

As shown in FIG. 30, in a liquid crystal display device having a multi-gap structure in which the cell gaps of red (R), green (G), and blue (B) picture elements are different from each other, the capacitances (liquid crystal capacitances) between the common electrode and the picture element electrodes differ among each color picture element. For example, as shown in FIG. 30, in the case where the cell gap of a blue picture element B is 3.6 μm, that of a green picture element G is 4.6 μm, and that of a red picture element R is 5.6 μm, the liquid crystal capacitance of the blue picture element B is 4.6/3.6 times that of the green picture element G. As described in the first to seventh embodiments, in order to equalize voltage drops due to capacitive coupling among the red, green, and blue picture elements, it is necessary that the ratio between the liquid crystal capacitance and the capacitance to the control electrode be constant. Accordingly, it is necessary to set the ratio in terms of the amount of overlap between the control electrode and the sub picture element electrodes to the inverse ratio in terms of the cell gap. That is, as shown in FIG. 31, the area of the control electrode 113G of the green picture element G is set to 5.6/4.6 times that of the control electrode 113R of the red picture element R. Further, the area of the control electrode 113B of the blue picture element B is set to 4.6/3.6 times that of the control electrode 113G of the green picture element G.

Voltage drops due to capacitive coupling are equalized by changing the size of the control electrode for each of the red picture element R, the green picture element G, and the blue picture element B as described above, thus obtaining favorable display quality. Incidentally, instead of changing the area of the control electrode, the thickness of the insulating film between the control electrode and the sub picture element electrode may be changed for each color picture element. However, in the case where the thickness of the insulating film between the control electrode and the sub picture element electrode is changed for each color picture element, the number of manufacturing steps increases. Accordingly, changing the area of the control electrode as described above is easier.

Figure 32:
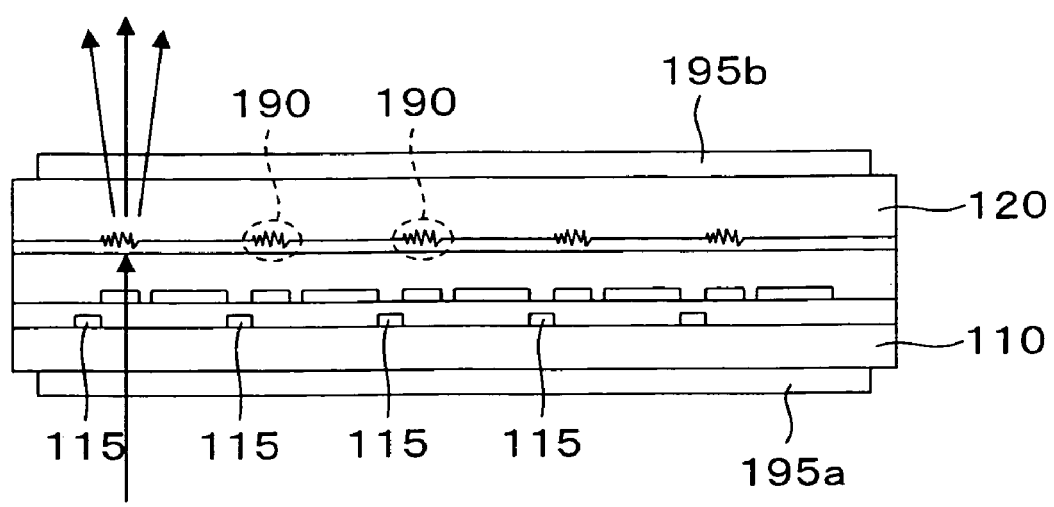
FIG. 32 is a schematic diagram showing an example of a liquid crystal display device in which scattering layers are provided in portions corresponding to the sub picture elements having the lowest threshold of T-V characteristics.

FIG. 32 shows an example in which scattering layers 190 are provided in portions corresponding to the sub picture elements having the lowest threshold of T-V characteristics in any one of the first to seventh embodiments. It is noted that, in FIG. 32, 195a and 195b denote polarizing plates respectively placed on both sides of the liquid crystal panel.

In the case where a display voltage is low, only part of the sub picture elements in each picture element transmit light, but the other sub picture elements do not transmit light. Accordingly, in the case where the picture element size is large, the impression that the screen is harsh is made. For this reason, as shown in FIG. 32, the scattering layers 190 are formed in portions corresponding to the sub picture elements having the lowest threshold of T-V characteristics. The scattering layers 190 are formed by, for example, a method in which the surface of the substrate 120 is roughened by etching, or the like. This allows light to be scattered and suppresses the harshness of the screen when brightness is low. Further, there is also the effect that viewing angle characteristics when brightness is low are improved by scattering.

Incidentally, in the case where a light scattering layer is placed between the polarizing plates 195a and 195b, polarization is disturbed and contrast is therefore decreased. However, in the case where the scattering layers 190 are placed only in part of the picture elements as in the example shown in this FIG. 32, a decrease in contrast is small, and problems do not occur in practical use.

In all of the first to seventh embodiments, the case where the present invention is applied to a transmissive liquid crystal display device has been described. However, the present invention can also be applied to a reflective liquid crystal display device or a semi-transmissive liquid crystal display.

(Area Ratio and Voltage Ratio)

In the case where capacitive coupling and a liquid crystal display device of the VA mode are combined as in the invention of the present application, there are the ranges of optimum values for the area ratio between sub picture element electrodes and the voltage ratio therebetween. FIGS. 33A to 33C, FIG. 34, and FIG. 35 are views showing the results of investigating combinations of the parameters. In these FIGS. 33A to 33C, FIG. 34, and FIG. 35, the horizontal axis represents the area ratio between sub picture element electrodes. That is, the horizontal axis represents the ratio between the area (area of a low-threshold region) of a sub picture element electrode directly coupled to a TFT and the area (area of a high-threshold region) of a sub picture element electrode capacitively coupled to a control electrode. Further, the vertical axis represents a voltage ratio, i.e., the ratio of the voltage at the sub picture element electrode capacitively coupled to the control electrode to the voltage at the sub picture element electrode directly coupled to the TFT. The voltage at the capacitively coupled sub picture element electrode is determined by capacitive voltage division.

For the above-described combinations, typical images which are easily influenced by discolor in a liquid crystal display device of the VA mode were selected, and contour graphs were created using a γ coefficient at the peak intensity level. It is noted that, in the graphs, the direction of the combination in which the γ coefficient is large, i.e., the combination in which the effect of improving discolor is larger, is indicated by an arrow.

Figure 33A:
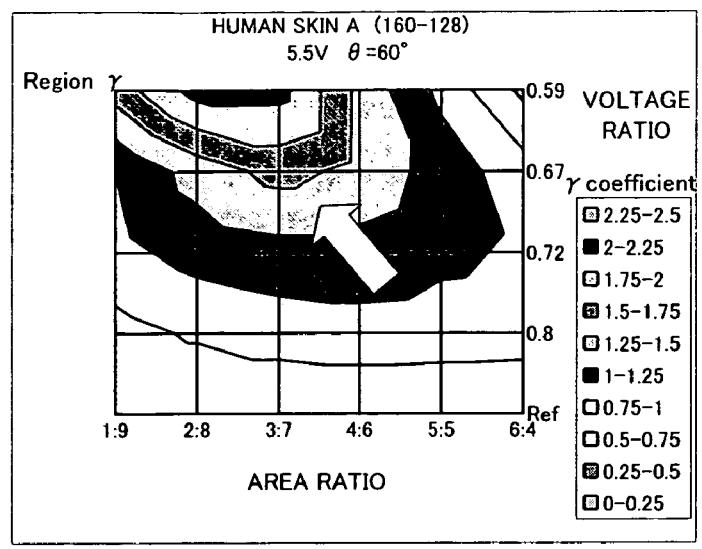
FIGS. 33A to 33C are views each showing optimum ranges of an area ratio and a voltage ratio in an image of human skin.
Figure 33B:
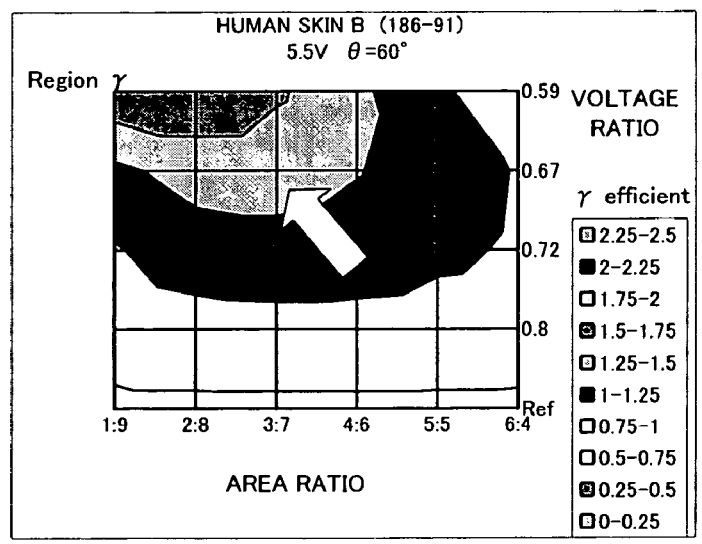
Figure 33C:
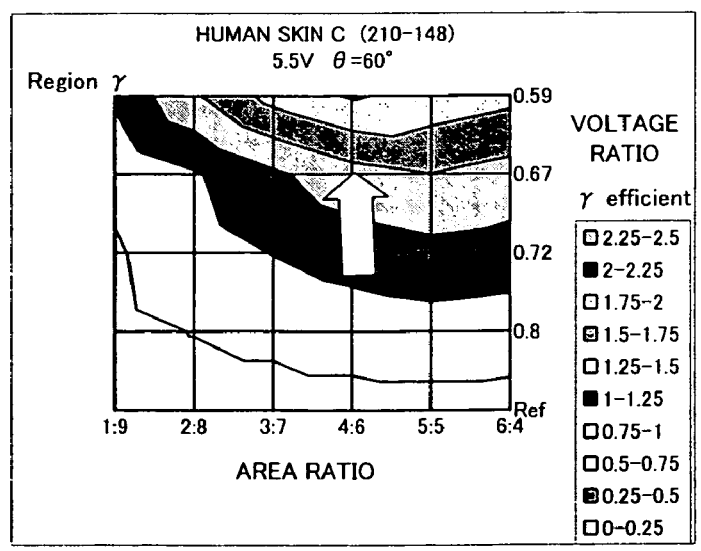
Figure 34:
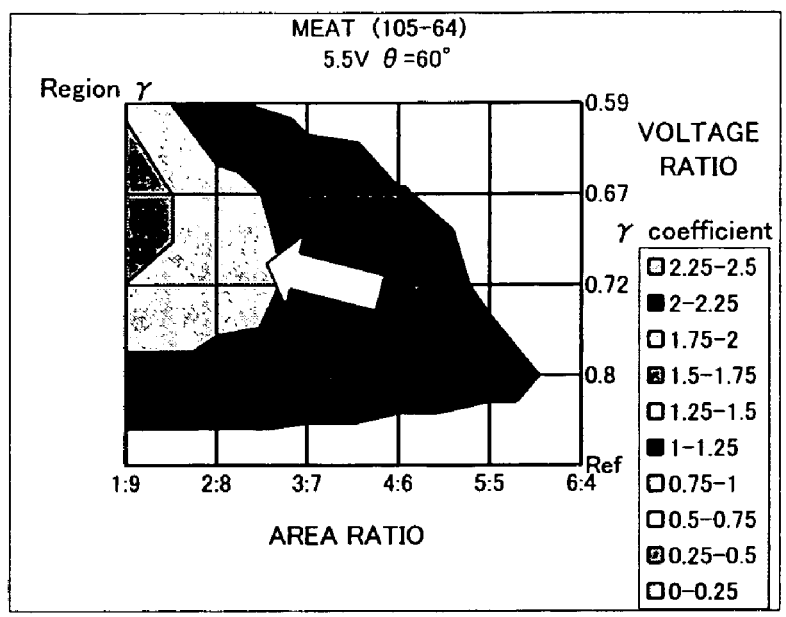
FIG. 34 is a view showing optimum ranges of an area ratio and a voltage ratio in an image of meat.

Each of FIGS. 33A to 33C shows the values of the intensity levels of an image of human skin. Human skin color is a color remembered by humans. An impression on a person in the image is often judged by color, and human skin color is important. Accordingly, the image can be said to be a typical image for which the improvement of discolor is important. Further, FIG. 34 shows the values of the intensity levels of an image of meat. The reproducibility of the image is important in terms of the possibility of arousing appetite, and this image is an image of lower intensity levels which is darker than that of human skin.

From FIGS. 33A to 33C and FIG. 34, it is obvious that there is little effect of improving discolor for voltage ratios of 0.8 or more and that the voltage ratio must be 0.8 or less.

Moreover, in terms of the area ratio, in the image of meat which is at low intensity levels, the effect of improving discolor is favorable when the area ratio is 1:9 or the like. In the images of human skin, the effect of improving discolor is favorable when the area ratio is 2:8 to 5:5, but the effect starts to decrease when the area ratio is 6:4. Further, when the area ratio is 6:4, no effect of improving discolor can be obtained in the image of meat which are at low intensity levels.

Figure 35:
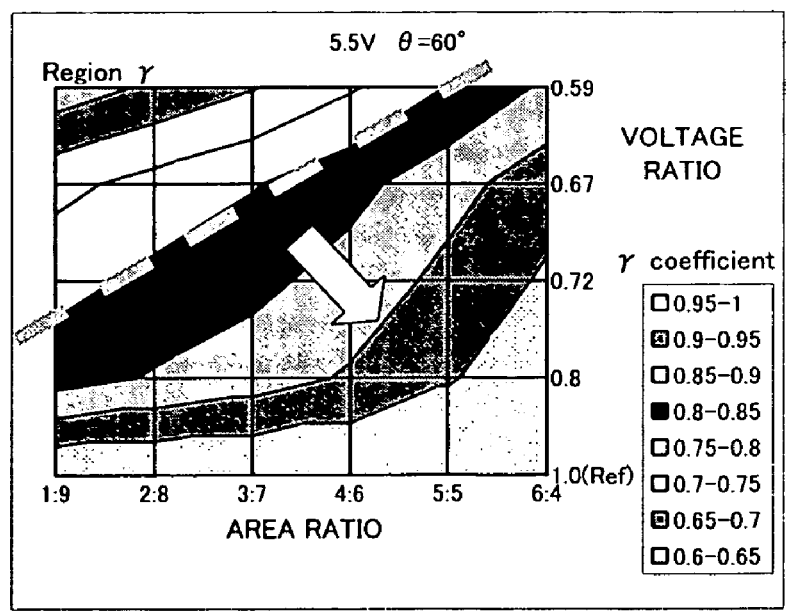
FIG. 35 is a view showing the relationship between transmittance and parameters of capacitive coupling.

FIG. 35 is a view showing the relationship between transmittance and the parameters of capacitive coupling. Since sufficient voltages are not supplied to sub picture element electrodes in high-threshold regions, transmittance tends to decrease. However, as the proportion of the areas of the sub picture element electrodes in the high-threshold regions decreases, and as the voltage ratio increases and deviations of thresholds decrease, a decrease in transmittance is reduced. The direction of the arrow in the drawing is the direction of favorable parameters at which transmittance is high.

From the comparison between FIG. 35 and each of FIGS. 33A to 33C and FIG. 34, optimum solutions for the parameters exist in opposite directions. As conditions under which a good balance is maintained between skin, meat, and transmittance, a four to six division and a voltage ratio of approximately 0.72 are ideal.

Incidentally, for a three-way division, combinations are more complex, but the trend is the same as that of the two-way division. However, an experiment has revealed the following fact: in three picture elements of a low-threshold region, an intermediate-threshold region, and a high-threshold region, if conditions for the case where the combination of (the low-threshold region+the intermediate-threshold region) and the high-threshold region or the combination of the low-threshold region and (the intermediate-threshold region+the high-threshold region) is considered fall into the ranges of the conditions for the case of the two-way division, there is not large difference. It is noted that, in the case where each picture element electrode is divided into three regions of a low-threshold region, an intermediate-threshold region, and a high-threshold region, 1:2:7, 1:3:6, 2:2:6, and the like are ideal conditions.

What is claimed is:

1. A liquid crystal display device comprising:
   first and second substrates placed to face each other;
   liquid crystals contained between the first and second substrates;
   a gate bus line provided on the first substrate and supplied with a scan signal;
   a data bus line provided on the first substrate and supplied with a display signal;
   a picture element electrode placed in a picture element region delimited by the gate bus line and the data bus line, the picture element electrode being divided into a plurality of sub picture element electrodes with a slit;
   a switching element connected to the gate bus line and the data bus line;
   a control electrode connected to the switching element and capacitively coupled to at least one of the plurality of sub picture element electrodes; and
   a common electrode provided on the second substrate,
   wherein at least part of the slit dividing the picture element electrode constitutes a domain regulation structure for regulating orientations of liquid crystal molecules when a voltage is applied.

2. The liquid crystal display device according to claim 1, wherein when the display signal is supplied to the data bus line and the scan signal is supplied to the gate bus line, a first voltage is applied to part of the plurality of sub picture element electrodes, and a second voltage different from the first voltage is applied to a rest of the sub picture element electrodes.

3. The liquid crystal display device according to claim 1, wherein the sub picture element electrode except the sub picture element electrode capacitively coupled to the control electrode is connected to the switching element.

4. The liquid crystal display device according to claim 1, wherein the only domain regulation structure on the first substrate is the slit.

5. The liquid crystal display device according to claim 1, wherein a second domain regulation structure for regulating the orientations of the liquid crystal molecules when the voltage is applied is formed on the second substrate.

6. The liquid crystal display device according to claim 5, wherein an interval between the slit and the second domain regulation structure is set for each sub picture element electrode.

7. The liquid crystal display device according to claim 5, wherein an interconnection for connecting the switching element and the control electrode is placed along the second domain regulation structure on the second substrate.

8. The liquid crystal display device according to claim 1, wherein a slit other than the slit constituting the domain regulation structure is placed approximately perpendicular to the slit constituting the domain regulation structure.

9. The liquid crystal display device according to claim 1, wherein the sub picture element electrode having a first parasitic capacitance to one data bus line of the two data bus lines adjacent to the picture element region and the sub picture element electrode having a second parasitic capacitance, which has approximately the same magnitude as the first parasitic capacitance, to other data bus line of the two data bus lines are electrically connected to each other.

10. The liquid crystal display device according to claim 1, wherein a conductive film for covering an interconnection for connecting the switching element and the control electrode is formed in an intersection of the interconnection and the slit.

11. The liquid crystal display device according to claim 1, wherein a scattering layer for scattering light is formed in part of at least any one of the first and second substrates which faces part of the plurality of sub picture element electrodes.

12. The liquid crystal display device according to claim 1, wherein the control electrode is formed on an auxiliary capacitance bus line crossing a center of the picture element region, with an insulating film interposed therebetween.

13. The liquid crystal display device according to claim 12, wherein the plurality of sub picture element electrodes include first and second sub picture element electrodes capacitively coupled to the control electrode, and
part of the control electrode which is capacitively coupled to the first sub picture element electrode and part of the control electrode which is capacitively coupled to the second sub picture element electrode are connected using an interconnection narrower than the auxiliary capacitance bus line.

14. The liquid crystal display device according to claim 12, wherein a conductive pattern connected to the auxiliary capacitance bus line is formed under an interconnection for connecting the switching element and the control electrode. , 15. The liquid crystal display device according to claim 12, wherein a conductive pattern connected to the auxiliary capacitance bus line is formed under the slit.

16. The liquid crystal display device according to claim 1, further comprising:
a color filter provided on any one of the first and second substrates,
wherein a thickness of a liquid crystal layer between the first and second substrates varies with color of the color filter.

17. The liquid crystal display device according to claim 16, wherein a size of the control electrode is smaller in a picture element in which a thickness of the liquid crystal layer is larger.

* * * * *